(12) United States Patent  (10) Patent No.: US 7,891,818 B2
Christensen et al.  (45) Date of Patent: Feb. 22, 2011

(54) SYSTEM AND METHOD FOR ALIGNING RGB LIGHT IN A SINGLE MODULATOR PROJECTOR

(75) Inventors: Robert R. Christensen, Rapid City, SD (US); Bret D. Winkler, South Jordan, UT (US); Dennis Elkins, Draper, UT (US); Allen H. Tanner, Sandy, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 187 days.

(21) Appl. No.: 12/001,771

(22) Filed: Dec. 12, 2007

(65) Prior Publication Data

US 2008/0212035 A1  Sep. 4, 2008

Related U.S. Application Data

(60) Provisional application No. 60/874,605, filed on Dec. 12, 2006.

(51) Int. Cl.
   *G03B 21/00* (2006.01)
(52) U.S. Cl. .................. 353/31; 353/84; 353/94; 353/76; 353/122; 372/25; 372/28; 372/29.02; 372/6; 372/30; 348/754; 348/769; 348/E5.139; 348/311; 348/750; 348/203; 348/756; 348/205; 359/291; 359/238; 359/276; 359/278; 359/290
(58) Field of Classification Search .................. 353/31, 353/94, 84, 76, 122; 372/25, 28, 29.02, 6, 372/30; 348/742, 743, 771, 754, 769, E5.139, 348/311; 359/290, 291, 238, 276, 278
See application file for complete search history.

(56) References Cited

U.S. PATENT DOCUMENTS

| 449,435 | A | 3/1891 | Brotz |
| 1,525,550 | A | 2/1925 | Jenkins |
| 1,548,262 | A | 8/1925 | Freedman |

(Continued)

FOREIGN PATENT DOCUMENTS

DE   2 325 028   12/1974

(Continued)

OTHER PUBLICATIONS

Abrash, "The Quake Graphics Engine," CGDC Quake Talk taken from Computer Game Developers Conference on Apr. 2, 1996. http://gamers.org/dEngine/quake/papers/mikeab-cgdc.html.

(Continued)

*Primary Examiner*—Georgia Y Epps
*Assistant Examiner*—Sultan Chowdhury
(74) *Attorney, Agent, or Firm*—Clayton Howarth & Cannon, P.C.

(57) ABSTRACT

A projection system that includes a singe light modulation device and a plurality of light sources of different wavelengths. Each wavelength of light is incident on the light modulation device at a spatially distinct location and a temporally distinct time. The use of a scanning mirror allows the projection system to sequentially form, in full-color, each of the columns or rows of an image. The projection system is characterized by the reduction of color separation or the rainbow effect due to the rendering of each column or row in full color.

43 Claims, 8 Drawing Sheets

U.S. PATENT DOCUMENTS

| | | |
|---|---|---|
| 1,702,195 A | 2/1929 | Centeno |
| 1,814,701 A | 7/1931 | Ives |
| 2,415,226 A | 2/1947 | Sziklai |
| 2,688,048 A | 8/1954 | Rose |
| 2,764,628 A | 9/1956 | Bambara |
| 2,783,406 A | 2/1957 | Vanderhooft |
| 2,991,690 A | 7/1961 | Grey et al. |
| 3,201,797 A | 8/1965 | Roth |
| 3,345,462 A | 10/1967 | Good et al. |
| 3,370,505 A | 2/1968 | Bryan |
| 3,418,459 A | 12/1968 | Purdy et al. |
| 3,422,419 A | 1/1969 | Mathews et al. |
| 3,485,944 A | 12/1969 | Stephens, Jr. |
| 3,534,338 A | 10/1970 | Christensen et al. |
| 3,553,364 A | 1/1971 | Lee |
| 3,576,394 A | 4/1971 | Lee |
| 3,577,031 A | 5/1971 | Welsh et al. |
| 3,600,798 A | 8/1971 | Lee |
| 3,602,702 A | 8/1971 | Warnock |
| 3,605,083 A | 9/1971 | Kramer |
| 3,633,999 A | 1/1972 | Buckles |
| 3,656,837 A | 4/1972 | Sandbank |
| 3,659,920 A | 5/1972 | McGlasson |
| 3,668,622 A | 6/1972 | Gannett et al. |
| 3,688,298 A | 8/1972 | Miller et al. |
| 3,709,581 A | 1/1973 | McGlasson |
| 3,711,826 A | 1/1973 | La Russa |
| 3,734,602 A | 5/1973 | Deck |
| 3,734,605 A | 5/1973 | Yevick |
| 3,736,526 A | 5/1973 | Simmons |
| 3,737,573 A | 6/1973 | Kessler |
| 3,746,911 A | 7/1973 | Nathanson et al. |
| 3,757,161 A | 9/1973 | Kline |
| 3,760,222 A | 9/1973 | Smith |
| 3,764,719 A | 10/1973 | Dell |
| 3,775,760 A | 11/1973 | Strathman |
| 3,781,465 A | 12/1973 | Ernstoff et al. |
| 3,783,184 A | 1/1974 | Ernstoff et al. |
| 3,785,715 A | 1/1974 | Mecklenborg |
| 3,802,769 A | 4/1974 | Rotz et al. |
| 3,816,726 A | 6/1974 | Sutherland et al. |
| 3,818,129 A | 6/1974 | Yamamoto |
| 3,831,106 A | 8/1974 | Ward |
| 3,846,826 A | 11/1974 | Mueller |
| 3,862,360 A | 1/1975 | Dill et al. |
| 3,886,310 A | 5/1975 | Guldberg et al. |
| 3,889,107 A | 6/1975 | Sutherland |
| 3,891,889 A | 6/1975 | Fazio |
| 3,896,338 A | 7/1975 | Nathanson et al. |
| 3,899,662 A | 8/1975 | Kreeger et al. |
| 3,915,548 A | 10/1975 | Opittek et al. |
| 3,920,495 A | 11/1975 | Roberts |
| 3,922,585 A | 11/1975 | Andrews |
| 3,934,173 A | 1/1976 | Korver |
| 3,935,499 A | 1/1976 | Oess |
| 3,940,204 A | 2/1976 | Withrington |
| 3,943,281 A | 3/1976 | Keller et al. |
| 3,947,105 A | 3/1976 | Smith |
| 3,969,611 A | 7/1976 | Fonteneau |
| 3,983,452 A | 9/1976 | Bazin |
| 3,991,416 A | 11/1976 | Byles et al. |
| 4,001,663 A | 1/1977 | Bray |
| 4,009,939 A | 3/1977 | Okano |
| 4,016,658 A | 4/1977 | Porter et al. |
| 4,017,158 A | 4/1977 | Booth |
| 4,017,985 A | 4/1977 | Heartz |
| 4,021,841 A | 5/1977 | Weinger |
| 4,027,403 A | 6/1977 | Marsh et al. |
| 4,028,725 A | 6/1977 | Lewis |
| 4,048,653 A | 9/1977 | Spooner |
| 4,067,129 A | 1/1978 | Abramson et al. |
| 4,077,138 A | 3/1978 | Foerst |
| 4,093,346 A | 6/1978 | Nishino et al. |
| 4,093,347 A | 6/1978 | La Russa |
| 4,100,571 A | 7/1978 | Dykes et al. |
| 4,119,956 A | 10/1978 | Murray |
| 4,120,028 A | 10/1978 | Membrino et al. |
| 4,138,726 A | 2/1979 | Girault et al. |
| 4,139,257 A | 2/1979 | Matsumoto |
| 4,139,799 A | 2/1979 | Kureha et al. |
| 4,149,184 A | 4/1979 | Giddings et al. |
| 4,152,766 A | 5/1979 | Osofsky et al. |
| 4,163,570 A | 8/1979 | Greenaway |
| 4,170,400 A | 10/1979 | Bach et al. |
| 4,177,579 A | 12/1979 | Peters et al. |
| 4,184,700 A | 1/1980 | Greenaway |
| 4,195,911 A | 4/1980 | Bougon et al. |
| 4,197,559 A | 4/1980 | Gramling |
| 4,200,866 A | 4/1980 | Strathman |
| 4,203,051 A | 5/1980 | Hallett et al. |
| 4,211,918 A | 7/1980 | Nyfeler et al. |
| 4,222,106 A | 9/1980 | Hess et al. |
| 4,223,050 A | 9/1980 | Nyfeler et al. |
| 4,229,732 A | 10/1980 | Hartstein et al. |
| 4,234,891 A | 11/1980 | Beck et al. |
| 4,241,519 A | 12/1980 | Gilson et al. |
| 4,250,217 A | 2/1981 | Greenaway |
| 4,250,393 A | 2/1981 | Greenaway |
| 4,289,371 A | 9/1981 | Kramer |
| 4,297,723 A | 10/1981 | Whitby |
| 4,303,394 A | 12/1981 | Berke et al. |
| 4,305,057 A | 12/1981 | Rolston |
| 4,318,173 A | 3/1982 | Freedman et al. |
| 4,333,144 A | 6/1982 | Whiteside et al. |
| 4,335,402 A | 6/1982 | Holmes |
| 4,335,933 A | 6/1982 | Palmer |
| 4,338,661 A | 7/1982 | Tredennick et al. |
| 4,340,878 A | 7/1982 | Spooner et al. |
| 4,342,083 A | 7/1982 | Freedman et al. |
| 4,343,037 A | 8/1982 | Bolton |
| 4,343,532 A | 8/1982 | Palmer |
| 4,345,817 A | 8/1982 | Gwynn |
| 4,347,507 A | 8/1982 | Spooner |
| 4,348,184 A | 9/1982 | Moore |
| 4,348,185 A | 9/1982 | Breglia et al. |
| 4,348,186 A | 9/1982 | Harvey et al. |
| 4,349,815 A | 9/1982 | Spooner |
| 4,356,730 A | 11/1982 | Cade |
| 4,360,884 A | 11/1982 | Okada et al. |
| 4,375,685 A | 3/1983 | Le Goff et al. |
| 4,384,324 A | 5/1983 | Kim et al. |
| 4,390,253 A | 6/1983 | Lobb |
| 4,393,394 A | 7/1983 | McCoy |
| 4,394,727 A | 7/1983 | Hoffman et al. |
| 4,398,794 A | 8/1983 | Palmer et al. |
| 4,398,795 A | 8/1983 | Palmer |
| 4,399,861 A | 8/1983 | Carlson |
| 4,408,884 A | 10/1983 | Kleinknecht et al. |
| 4,422,019 A | 12/1983 | Meyer |
| 4,427,274 A | 1/1984 | Pund et al. |
| 4,431,260 A | 2/1984 | Palmer |
| 4,435,756 A | 3/1984 | Potash |
| 4,437,113 A | 3/1984 | Lee et al. |
| 4,439,157 A | 3/1984 | Breglia et al. |
| 4,440,839 A | 4/1984 | Mottier |
| 4,441,791 A | 4/1984 | Horbeck |
| 4,445,197 A | 4/1984 | Lorie et al. |
| 4,446,480 A | 5/1984 | Breglia et al. |
| 4,463,372 A | 7/1984 | Bennett et al. |
| 4,466,123 A | 8/1984 | Arai et al. |
| 4,471,433 A | 9/1984 | Matsumoto et al. |
| 4,472,732 A | 9/1984 | Bennett et al. |
| 4,487,584 A | 12/1984 | Allen et al. |
| 4,492,435 A | 1/1985 | Banton et al. |

| | | | | | | |
|---|---|---|---|---|---|---|
| 4,498,136 | A | 2/1985 | Sproul, III | 4,766,555 A | 8/1988 | Bennett |
| 4,499,457 | A | 2/1985 | Hintze | 4,769,762 A | 9/1988 | Tsujido |
| 4,500,163 | A | 2/1985 | Burns et al. | 4,772,881 A | 9/1988 | Hannah |
| 4,511,337 | A | 4/1985 | Fortunato et al. | 4,777,620 A | 10/1988 | Shimoni et al. |
| 4,536,058 | A | 8/1985 | Shaw et al. | 4,780,084 A | 10/1988 | Donovan |
| 4,539,638 | A | 9/1985 | Gaffney | 4,780,711 A | 10/1988 | Doumas |
| 4,546,431 | A | 10/1985 | Horvath | 4,791,583 A | 12/1988 | Colburn |
| 4,566,935 | A | 1/1986 | Hornbeck | 4,794,386 A | 12/1988 | Bedrij et al. |
| 4,570,233 | A | 2/1986 | Yan et al. | 4,795,226 A | 1/1989 | Bennion et al. |
| 4,582,396 | A | 4/1986 | Bos et al. | 4,796,020 A | 1/1989 | Budrikis et al. |
| 4,583,185 | A | 4/1986 | Heartz | 4,799,106 A | 1/1989 | Moore et al. |
| 4,586,037 | A | 4/1986 | Rosener et al. | 4,805,107 A | 2/1989 | Kieckhafer et al. |
| 4,586,038 | A | 4/1986 | Sims et al. | 4,807,158 A | 2/1989 | Blanton et al. |
| 4,589,093 | A | 5/1986 | Ippolito et al. | 4,807,183 A | 2/1989 | Kung et al. |
| 4,590,555 | A | 5/1986 | Bourrez | 4,811,245 A | 3/1989 | Bunker et al. |
| 4,591,844 | A | 5/1986 | Hickin et al. | 4,812,988 A | 3/1989 | Duthuit et al. |
| 4,596,992 | A | 6/1986 | Hornbeck | 4,821,212 A | 4/1989 | Heartz |
| 4,597,633 | A | 7/1986 | Fussell | 4,825,391 A | 4/1989 | Merz |
| 4,598,372 | A | 7/1986 | McRoberts | 4,833,528 A | 5/1989 | Kobayashi |
| 4,599,070 | A | 7/1986 | Hladky et al. | 4,837,740 A | 6/1989 | Sutherland |
| 4,609,939 | A | 9/1986 | Kozawa et al. | 4,854,669 A | 8/1989 | Birnbach et al. |
| 4,616,217 | A | 10/1986 | Nesbitt et al. | 4,855,934 A | 8/1989 | Robinson |
| 4,616,262 | A | 10/1986 | Toriumi et al. | 4,855,937 A | 8/1989 | Heartz |
| 4,623,223 | A | 11/1986 | Kempf | 4,855,939 A | 8/1989 | Fitzgerald, Jr. et al. |
| 4,623,880 | A | 11/1986 | Bresenham et al. | 4,855,943 A | 8/1989 | Lewis |
| 4,625,289 | A | 11/1986 | Rockwood | 4,856,869 A | 8/1989 | Sakata et al. |
| 4,630,101 | A | 12/1986 | Inaba et al. | 4,868,766 A | 9/1989 | Oosterholt |
| 4,630,884 | A | 12/1986 | Jubinski | 4,868,771 A | 9/1989 | Quick et al. |
| 4,631,690 | A | 12/1986 | Corthout et al. | 4,873,515 A | 10/1989 | Dickson et al. |
| 4,633,243 | A | 12/1986 | Bresenham et al. | 4,884,275 A | 11/1989 | Simms |
| 4,634,384 | A | 1/1987 | Neves et al. | 4,885,703 A | 12/1989 | Deering |
| 4,636,031 | A | 1/1987 | Schmadel, Jr. et al. | 4,893,353 A | 1/1990 | Iwaoka et al. |
| 4,636,384 | A | 1/1987 | Stolle et al. | 4,893,515 A | 1/1990 | Uchida |
| 4,642,756 | A | 2/1987 | Sherrod | 4,897,715 A | 1/1990 | Beamon, III |
| 4,642,790 | A | 2/1987 | Minshull et al. | 4,899,293 A | 2/1990 | Dawson et al. |
| 4,642,945 | A | 2/1987 | Browning et al. | 4,907,237 A | 3/1990 | Dahmani et al. |
| 4,645,459 | A | 2/1987 | Graf et al. | 4,912,526 A | 3/1990 | Iwaoka et al. |
| 4,646,251 | A | 2/1987 | Hayes et al. | 4,915,463 A | 4/1990 | Barbee, Jr. |
| 4,647,966 | A | 3/1987 | Phillips et al. | 4,918,626 A | 4/1990 | Watkins et al. |
| 4,655,539 | A | 4/1987 | Caulfield et al. | 4,930,888 A | 6/1990 | Freisleben et al. |
| 4,656,506 | A | 4/1987 | Ritchey | 4,935,879 A | 6/1990 | Ueda |
| 4,656,578 | A | 4/1987 | Chilinski et al. | 4,938,584 A | 7/1990 | Suematsu et al. |
| 4,657,512 | A | 4/1987 | Mecklenborg | 4,940,972 A | 7/1990 | Mouchot et al. |
| 4,658,351 | A | 4/1987 | Teng | 4,949,280 A | 8/1990 | Littlefield |
| 4,662,746 | A | 5/1987 | Hornbeck | 4,952,152 A | 8/1990 | Briggs et al. |
| 4,663,617 | A | 5/1987 | Stockwell | 4,952,922 A | 8/1990 | Griffin et al. |
| 4,671,650 | A | 6/1987 | Hirzel et al. | 4,953,107 A | 8/1990 | Hedley et al. |
| 4,672,215 | A | 6/1987 | Howard | 4,954,819 A | 9/1990 | Watkins |
| 4,672,275 | A | 6/1987 | Ando | 4,955,034 A | 9/1990 | Scerbak |
| 4,677,576 | A | 6/1987 | Berlin, Jr. et al. | 4,959,803 A | 9/1990 | Kiyohara et al. |
| 4,679,040 | A | 7/1987 | Yan | 4,969,714 A | 11/1990 | Fournier, Jr. et al. |
| 4,684,215 | A | 8/1987 | Shaw et al. | 4,970,500 A | 11/1990 | Hintze |
| 4,692,880 | A | 9/1987 | Merz et al. | 4,974,155 A | 11/1990 | Dulong et al. |
| 4,698,602 | A | 10/1987 | Armitage | 4,974,176 A | 11/1990 | Buchner et al. |
| 4,704,605 | A | 11/1987 | Edelson | 4,982,178 A | 1/1991 | Hintze |
| 4,710,732 | A | 12/1987 | Hornbeck | 4,984,824 A | 1/1991 | Antes et al. |
| 4,714,428 | A | 12/1987 | Bunker et al. | 4,985,831 A | 1/1991 | Dulong et al. |
| 4,715,005 | A | 12/1987 | Heartz | 4,985,854 A | 1/1991 | Wittenburg |
| 4,720,705 | A | 1/1988 | Gupta et al. | 4,991,955 A | 2/1991 | Vetter |
| 4,720,747 | A | 1/1988 | Crowley | 4,992,780 A | 2/1991 | Penna et al. |
| 4,725,110 | A | 2/1988 | Glenn et al. | 4,994,794 A | 2/1991 | Price et al. |
| 4,727,365 | A | 2/1988 | Bunker et al. | 5,005,005 A | 4/1991 | Brossia et al. |
| 4,730,261 | A | 3/1988 | Smith | 5,007,705 A | 4/1991 | Morey et al. |
| 4,731,859 | A | 3/1988 | Holter et al. | 5,011,276 A | 4/1991 | Iwamoto |
| 4,735,410 | A | 4/1988 | Nobuta | 5,016,643 A | 5/1991 | Applegate et al. |
| 4,743,200 | A | 5/1988 | Welch et al. | 5,022,732 A | 6/1991 | Engan et al. |
| 4,744,615 | A | 5/1988 | Fan et al. | 5,022,750 A | 6/1991 | Flasck |
| 4,748,572 | A | 5/1988 | Latham | 5,023,725 A | 6/1991 | McCutchen |
| 4,751,509 | A | 6/1988 | Kubota et al. | 5,023,818 A | 6/1991 | Wittensoldner et al. |
| 4,760,388 | A | 7/1988 | Tatsumi et al. | 5,025,394 A | 6/1991 | Parke |
| 4,760,917 | A | 8/1988 | Vitek | 5,025,400 A | 6/1991 | Cook et al. |
| 4,761,253 | A | 8/1988 | Antes | 5,035,473 A | 7/1991 | Kuwayama et al. |
| 4,763,280 | A | 8/1988 | Robinson et al. | 5,038,352 A | 8/1991 | Lenth et al. |

| | | | | | | |
|---|---|---|---|---|---|---|
| 5,043,924 | A | 8/1991 | Hofmann | 5,326,266 | A | 7/1994 | Fisher et al. |
| 5,047,626 | A | 9/1991 | Bobb et al. | 5,329,323 | A | 7/1994 | Biles |
| 5,053,698 | A | 10/1991 | Ueda | 5,333,021 | A * | 7/1994 | Mitsutake et al. ............ 353/122 |
| 5,058,992 | A | 10/1991 | Takahashi | 5,333,245 | A | 7/1994 | Vecchione |
| 5,059,019 | A | 10/1991 | McCullough | 5,341,460 | A | 8/1994 | Tam |
| 5,061,919 | A | 10/1991 | Watkins | 5,345,280 | A | 9/1994 | Kimura et al. |
| 5,063,375 | A | 11/1991 | Lien et al. | 5,347,433 | A | 9/1994 | Sedlmayr |
| 5,077,608 | A | 12/1991 | Dubner | 5,347,620 | A | 9/1994 | Zimmer |
| 5,088,095 | A | 2/1992 | Zirngibl | 5,348,477 | A | 9/1994 | Welch et al. |
| 5,089,903 | A | 2/1992 | Kuwayama et al. | 5,353,390 | A | 10/1994 | Harrington |
| 5,095,491 | A | 3/1992 | Kozlovsky et al. | 5,357,579 | A | 10/1994 | Buchner et al. |
| 5,097,427 | A | 3/1992 | Lathrop et al. | 5,359,526 | A | 10/1994 | Whittington et al. |
| 5,101,184 | A | 3/1992 | Antes | 5,359,704 | A | 10/1994 | Rossignac et al. |
| 5,103,306 | A | 4/1992 | Weiman et al. | 5,360,010 | A | 11/1994 | Applegate |
| 5,103,339 | A | 4/1992 | Broome | 5,361,386 | A | 11/1994 | Watkins et al. |
| 5,111,468 | A | 5/1992 | Kozlovsky et al. | 5,363,220 | A | 11/1994 | Kuwayama et al. |
| 5,113,455 | A | 5/1992 | Scott | 5,363,475 | A | 11/1994 | Baker et al. |
| 5,115,127 | A | 5/1992 | Bobb et al. | 5,363,476 | A | 11/1994 | Kurashige et al. |
| 5,117,221 | A | 5/1992 | Mishica, Jr. | 5,367,585 | A | 11/1994 | Ghezzo et al. |
| RE33,973 | E | 6/1992 | Kriz et al. | 5,367,615 | A | 11/1994 | Economy et al. |
| 5,121,086 | A | 6/1992 | Srivastava | 5,369,450 | A | 11/1994 | Haseltine et al. |
| 5,123,085 | A | 6/1992 | Wells et al. | 5,369,735 | A | 11/1994 | Thier et al. |
| 5,124,821 | A | 6/1992 | Antier et al. | 5,369,739 | A | 11/1994 | Akeley |
| 5,132,812 | A | 7/1992 | Takahashi et al. | 5,377,320 | A | 12/1994 | Abi-Ezzi et al. |
| 5,134,521 | A | 7/1992 | Lacroix et al. | 5,379,371 | A | 1/1995 | Usami et al. |
| 5,136,675 | A | 8/1992 | Hodson | 5,380,995 | A | 1/1995 | Udd et al. |
| 5,136,818 | A | 8/1992 | Bramson | 5,381,338 | A | 1/1995 | Wysocki et al. |
| 5,142,788 | A | 9/1992 | Willetts | 5,381,519 | A | 1/1995 | Brown et al. |
| 5,155,604 | A | 10/1992 | Miekka et al. | 5,384,719 | A | 1/1995 | Baker et al. |
| 5,157,385 | A | 10/1992 | Nakao et al. | 5,388,206 | A | 2/1995 | Poulton et al. |
| 5,159,601 | A | 10/1992 | Huber | 5,394,414 | A | 2/1995 | Kozlovsky et al. |
| 5,161,013 | A | 11/1992 | Rylander et al. | 5,394,515 | A | 2/1995 | Lentz et al. |
| 5,175,575 | A | 12/1992 | Gersuk | 5,394,516 | A | 2/1995 | Winser |
| 5,179,638 | A | 1/1993 | Dawson et al. | 5,396,349 | A | 3/1995 | Roberts et al. |
| 5,185,852 | A | 2/1993 | Mayer | 5,398,083 | A | 3/1995 | Tsujihara et al. |
| 5,194,969 | A | 3/1993 | DiFrancesco | 5,408,249 | A | 4/1995 | Wharton et al. |
| 5,196,922 | A | 3/1993 | Yeomans | 5,408,606 | A | 4/1995 | Eckart |
| 5,198,661 | A | 3/1993 | Anderson et al. | 5,410,371 | A | 4/1995 | Lambert |
| 5,200,818 | A | 4/1993 | Neta et al. | 5,412,796 | A | 5/1995 | Olive |
| 5,206,868 | A | 4/1993 | Deacon | 5,422,986 | A | 6/1995 | Neely |
| 5,214,757 | A | 5/1993 | Mauney et al. | 5,430,888 | A | 7/1995 | Witek et al. |
| 5,222,205 | A | 6/1993 | Larson et al. | 5,432,863 | A | 7/1995 | Benati et al. |
| 5,226,109 | A | 7/1993 | Dawson et al. | 5,444,839 | A | 8/1995 | Silverbrook et al. |
| 5,227,863 | A | 7/1993 | Bilbrey et al. | 5,451,765 | A | 9/1995 | Gerber |
| 5,229,593 | A | 7/1993 | Cato | 5,459,610 | A | 10/1995 | Bloom et al. |
| 5,230,039 | A | 7/1993 | Grossman et al. | 5,459,835 | A | 10/1995 | Trevett |
| 5,231,388 | A | 7/1993 | Stoltz | 5,465,121 | A | 11/1995 | Blalock et al. |
| 5,239,625 | A | 8/1993 | Bogart et al. | 5,465,368 | A | 11/1995 | Davidson et al. |
| 5,241,659 | A | 8/1993 | Parulski et al. | 5,471,545 | A | 11/1995 | Negami et al. |
| 5,242,306 | A | 9/1993 | Fisher | 5,471,567 | A | 11/1995 | Soderberg et al. |
| 5,243,448 | A | 9/1993 | Banbury | 5,473,373 | A | 12/1995 | Hwung et al. |
| 5,251,160 | A | 10/1993 | Rockwood et al. | 5,473,391 | A | 12/1995 | Usui |
| 5,252,068 | A | 10/1993 | Gryder | 5,479,597 | A | 12/1995 | Fellous |
| 5,255,274 | A | 10/1993 | Wysocki et al. | 5,480,305 | A | 1/1996 | Montag et al. |
| 5,266,930 | A | 11/1993 | Ichikawa et al. | 5,487,665 | A | 1/1996 | Lechner et al. |
| 5,267,045 | A | 11/1993 | Stroomer | 5,488,687 | A | 1/1996 | Rich |
| 5,272,473 | A | 12/1993 | Thompson et al. | 5,489,920 | A | 2/1996 | Kaasila |
| 5,276,849 | A | 1/1994 | Patel | 5,490,238 | A | 2/1996 | Watkins |
| 5,285,397 | A | 2/1994 | Heier et al. | 5,490,240 | A | 2/1996 | Foran et al. |
| 5,291,317 | A | 3/1994 | Newswanger | 5,493,439 | A | 2/1996 | Engle |
| 5,293,233 | A | 3/1994 | Billing et al. | 5,493,629 | A | 2/1996 | Stange |
| 5,297,156 | A | 3/1994 | Deacon | 5,495,563 | A | 2/1996 | Winser |
| 5,300,942 | A | 4/1994 | Dolgoff | 5,499,194 | A | 3/1996 | Prestidge et al. |
| 5,301,062 | A | 4/1994 | Takahashi et al. | 5,500,747 | A | 3/1996 | Tanide et al. |
| 5,311,360 | A | 5/1994 | Bloom et al. | 5,500,761 | A | 3/1996 | Goossen et al. |
| 5,315,699 | A | 5/1994 | Imai et al. | 5,502,482 | A | 3/1996 | Graham |
| 5,317,576 | A | 5/1994 | Leonberger et al. | 5,502,782 | A | 3/1996 | Smith |
| 5,317,689 | A | 5/1994 | Nack et al. | 5,504,496 | A | 4/1996 | Tanaka et al. |
| 5,319,744 | A | 6/1994 | Kelly et al. | 5,506,949 | A | 4/1996 | Perrin |
| 5,320,353 | A | 6/1994 | Moore | 5,519,518 | A | 5/1996 | Watanabe et al. |
| 5,320,534 | A | 6/1994 | Thomas | 5,535,374 | A | 7/1996 | Olive |
| 5,325,133 | A | 6/1994 | Adachi | 5,536,085 | A | 7/1996 | Li et al. |
| 5,325,485 | A | 6/1994 | Hochmuth et al. | 5,537,159 | A | 7/1996 | Suematsu et al. |

| | | | | | | |
|---|---|---|---|---|---|---|
| 5,539,577 A | 7/1996 | Si et al. | | 5,825,363 A | 10/1998 | Anderson |
| 5,541,769 A | 7/1996 | Ansley et al. | | 5,825,538 A | 10/1998 | Walker |
| 5,544,306 A | 8/1996 | Deering et al. | | 5,835,256 A | 11/1998 | Huibers |
| 5,544,340 A | 8/1996 | Doi et al. | | 5,837,996 A | 11/1998 | Keydar |
| 5,550,960 A | 8/1996 | Shirman et al. | | 5,838,328 A | 11/1998 | Roller |
| 5,551,283 A | 9/1996 | Manaka et al. | | 5,838,484 A | 11/1998 | Goossen |
| 5,557,297 A | 9/1996 | Sharp et al. | | 5,841,443 A | 11/1998 | Einkauf |
| 5,557,733 A | 9/1996 | Hicok et al. | | 5,841,447 A | 11/1998 | Drews |
| 5,559,952 A | 9/1996 | Fujimoto | | 5,841,579 A | 11/1998 | Bloom et al. |
| 5,559,954 A | 9/1996 | Sakoda et al. | | 5,850,225 A | 12/1998 | Cosman |
| 5,561,745 A | 10/1996 | Jackson et al. | | 5,854,631 A | 12/1998 | Akeley et al. |
| 5,566,370 A | 10/1996 | Young | | 5,854,865 A | 12/1998 | Goldberg |
| 5,572,229 A | 11/1996 | Fisher | | 5,860,721 A | 1/1999 | Bowron et al. |
| 5,574,847 A | 11/1996 | Eckart et al. | | 5,864,342 A | 1/1999 | Kajiya et al. |
| 5,579,456 A | 11/1996 | Cosman | | 5,867,166 A | 2/1999 | Myhrvold et al. |
| 5,584,696 A | 12/1996 | Walker et al. | | 5,867,301 A | 2/1999 | Engle |
| 5,586,291 A | 12/1996 | Lasker et al. | | 5,870,097 A | 2/1999 | Snyder et al. |
| 5,590,254 A | 12/1996 | Lippincott et al. | | 5,870,098 A | 2/1999 | Gardiner |
| 5,594,854 A | 1/1997 | Baldwin et al. | | 5,874,967 A | 2/1999 | West et al. |
| 5,598,517 A | 1/1997 | Watkins | | 5,889,529 A | 3/1999 | Jones et al. |
| 5,604,849 A | 2/1997 | Artwick et al. | | 5,900,881 A | 5/1999 | Ikedo |
| 5,610,665 A | 3/1997 | Berman et al. | | 5,903,272 A | 5/1999 | Otto |
| 5,612,710 A | 3/1997 | Christensen et al. | | 5,905,504 A | 5/1999 | Barkans et al. |
| 5,614,961 A * | 3/1997 | Gibeau et al. ............... 348/750 | | 5,908,300 A | 6/1999 | Walker et al. |
| 5,625,768 A | 4/1997 | Dye | | 5,909,225 A | 6/1999 | Schinnerer et al. |
| 5,627,605 A | 5/1997 | Kim | | 5,912,670 A | 6/1999 | Lipscomb et al. |
| 5,629,801 A | 5/1997 | Staker et al. | | 5,912,740 A | 6/1999 | Zare et al. |
| 5,630,037 A | 5/1997 | Schindler | | 5,917,495 A | 6/1999 | Doi et al. |
| 5,633,750 A | 5/1997 | Nogiwa et al. | | 5,920,361 A | 7/1999 | Gibeau et al. |
| 5,638,208 A | 6/1997 | Walker | | 5,923,333 A | 7/1999 | Stroyan |
| 5,648,860 A | 7/1997 | Ooi et al. | | 5,930,740 A | 7/1999 | Mathisen |
| 5,650,814 A | 7/1997 | Florent et al. | | 5,943,060 A | 8/1999 | Cosman et al. |
| 5,651,104 A | 7/1997 | Cosman | | 5,946,129 A | 8/1999 | Xu et al. |
| 5,657,077 A | 8/1997 | DeAngelis et al. | | 5,963,788 A | 10/1999 | Barron et al. |
| 5,658,060 A | 8/1997 | Dove | | 5,969,699 A | 10/1999 | Balram et al. |
| 5,659,490 A | 8/1997 | Imamura | | 5,969,721 A | 10/1999 | Chen et al. |
| 5,659,671 A | 8/1997 | Tannenbaum et al. | | 5,969,726 A | 10/1999 | Rentschler et al. |
| 5,661,592 A | 8/1997 | Bornstein et al. | | 5,974,059 A | 10/1999 | Dawson |
| 5,661,593 A | 8/1997 | Engle | | 5,977,977 A | 11/1999 | Kajiya et al. |
| 5,665,942 A | 9/1997 | Williams et al. | | 5,980,044 A | 11/1999 | Cannon et al. |
| 5,677,783 A | 10/1997 | Bloom et al. | | 5,982,553 A * | 11/1999 | Bloom et al. ............... 359/627 |
| 5,684,939 A | 11/1997 | Foran et al. | | 5,987,200 A | 11/1999 | Fleming et al. |
| 5,684,943 A | 11/1997 | Abraham et al. | | 5,988,814 A | 11/1999 | Rohlfing et al. |
| 5,689,437 A | 11/1997 | Nakagawa | | 5,990,935 A | 11/1999 | Rohlfing |
| 5,691,999 A | 11/1997 | Ball et al. | | 5,999,549 A | 12/1999 | Freitag et al. |
| 5,694,180 A | 12/1997 | Deter et al. | | 6,002,454 A | 12/1999 | Kajiwara et al. |
| 5,696,892 A | 12/1997 | Redmann et al. | | 6,002,505 A | 12/1999 | Kraenert et al. |
| 5,696,947 A | 12/1997 | Johns et al. | | 6,005,580 A | 12/1999 | Donovan |
| 5,699,497 A | 12/1997 | Erdahl et al. | | 6,005,611 A | 12/1999 | Gullichsen et al. |
| 5,703,604 A | 12/1997 | McCutchen | | 6,014,144 A | 1/2000 | Nelson et al. |
| 5,706,061 A | 1/1998 | Marshall et al. | | 6,014,163 A | 1/2000 | Houskeeper |
| 5,715,021 A | 2/1998 | Gibeau et al. | | 6,021,141 A | 2/2000 | Nam et al. |
| 5,719,951 A | 2/1998 | Shackleton et al. | | 6,031,541 A | 2/2000 | Lipscomb et al. |
| 5,724,561 A | 3/1998 | Tarolli et al. | | 6,034,739 A | 3/2000 | Rohlfing et al. |
| 5,726,785 A | 3/1998 | Chawki et al. | | 6,038,057 A | 3/2000 | Brazas, Jr. et al. |
| 5,734,386 A | 3/1998 | Cosman | | 6,042,238 A | 3/2000 | Blackham et al. |
| 5,734,521 A | 3/1998 | Fukudome et al. | | 6,052,125 A | 4/2000 | Gardiner et al. |
| 5,739,819 A | 4/1998 | Bar-Nahum | | 6,052,485 A | 4/2000 | Nelson et al. |
| 5,740,190 A | 4/1998 | Moulton | | 6,057,909 A | 5/2000 | Yahav et al. |
| 5,742,749 A | 4/1998 | Foran et al. | | 6,064,392 A | 5/2000 | Rohner |
| 5,748,264 A | 5/1998 | Hegg | | 6,064,393 A | 5/2000 | Lengyel et al. |
| 5,748,867 A | 5/1998 | Cosman et al. | | 6,069,903 A | 5/2000 | Zanger et al. |
| 5,761,709 A | 6/1998 | Kranich | | 6,072,500 A | 6/2000 | Foran et al. |
| 5,764,280 A | 6/1998 | Bloom et al. | | 6,072,544 A | 6/2000 | Gleim et al. |
| 5,764,311 A | 6/1998 | Bonde et al. | | 6,078,333 A | 6/2000 | Wittig et al. |
| 5,768,443 A | 6/1998 | Michael et al. | | 6,084,610 A | 7/2000 | Ozaki et al. |
| 5,781,666 A | 7/1998 | Ishizawa et al. | | 6,094,226 A | 7/2000 | Ke et al. |
| 5,793,912 A | 8/1998 | Boord et al. | | 6,094,267 A | 7/2000 | Levenson et al. |
| 5,798,743 A | 8/1998 | Bloom | | 6,094,298 A | 7/2000 | Luo et al. |
| 5,808,797 A | 9/1998 | Bloom et al. | | 6,100,906 A | 8/2000 | Asaro et al. |
| 5,818,456 A | 10/1998 | Cosman et al. | | 6,101,036 A | 8/2000 | Bloom |
| 5,818,998 A | 10/1998 | Harris et al. | | 6,108,054 A | 8/2000 | Heizmann et al. |
| 5,821,944 A | 10/1998 | Watkins | | 6,111,616 A | 8/2000 | Chauvin et al. |

| | | | |
|---|---|---|---|
| 6,122,413 A | 9/2000 | Jiang et al. | |
| 6,124,647 A | 9/2000 | Marcus et al. | |
| 6,124,808 A | 9/2000 | Budnovitch | |
| 6,124,922 A | 9/2000 | Sentoku | |
| 6,124,989 A | 9/2000 | Oode et al. | |
| 6,126,288 A | 10/2000 | Hewlett | |
| 6,128,019 A | 10/2000 | Crocker, III et al. | |
| 6,128,021 A | 10/2000 | van der Meulen et al. | |
| 6,130,770 A | 10/2000 | Bloom | |
| 6,134,339 A | 10/2000 | Luo | |
| 6,137,565 A | 10/2000 | Ecke et al. | |
| 6,137,932 A | 10/2000 | Kim et al. | |
| 6,141,013 A | 10/2000 | Nelson et al. | |
| 6,141,025 A | 10/2000 | Oka et al. | |
| 6,144,481 A | 11/2000 | Kowarz et al. | |
| 6,147,690 A | 11/2000 | Cosman | |
| 6,147,695 A | 11/2000 | Bowen et al. | |
| 6,147,789 A | 11/2000 | Gelbart | |
| 6,154,259 A | 11/2000 | Hargis et al. | |
| 6,175,579 B1 | 1/2001 | Sandford et al. | |
| 6,184,888 B1 | 2/2001 | Yuasa et al. | |
| 6,184,891 B1 | 2/2001 | Blinn | |
| 6,184,926 B1 | 2/2001 | Khosravi et al. | |
| 6,188,712 B1 | 2/2001 | Jiang et al. | |
| 6,191,827 B1 | 2/2001 | Segman et al. | |
| 6,195,099 B1 | 2/2001 | Gardiner | |
| 6,195,484 B1 | 2/2001 | Brennan, III et al. | |
| 6,195,609 B1 | 2/2001 | Pilley et al. | |
| 6,204,859 B1 | 3/2001 | Jouppi et al. | |
| 6,204,955 B1 | 3/2001 | Chao et al. | |
| 6,215,579 B1 | 4/2001 | Bloom et al. | |
| 6,219,015 B1 | 4/2001 | Bloom et al. | |
| 6,222,937 B1 | 4/2001 | Cohen et al. | |
| 6,229,650 B1 | 5/2001 | Reznichenko et al. | |
| 6,229,827 B1 | 5/2001 | Fernald et al. | |
| 6,233,025 B1 | 5/2001 | Wallenstein | |
| 6,236,408 B1 | 5/2001 | Watkins | |
| 6,240,220 B1 | 5/2001 | Pan et al. | |
| 6,262,739 B1 | 7/2001 | Migdal et al. | |
| 6,262,810 B1 | 7/2001 | Bloomer | |
| 6,263,002 B1 | 7/2001 | Hsu et al. | |
| 6,266,068 B1 | 7/2001 | Kang et al. | |
| 6,268,861 B1 | 7/2001 | Sanz-Pastor et al. | |
| 6,282,012 B1 | 8/2001 | Kowarz et al. | |
| 6,282,220 B1 | 8/2001 | Floyd | |
| 6,285,407 B1 | 9/2001 | Yasuki et al. | |
| 6,285,446 B1 | 9/2001 | Farhadiroushan | |
| 6,292,165 B1 | 9/2001 | Lin et al. | |
| 6,292,268 B1 | 9/2001 | Hirota et al. | |
| 6,292,310 B1 | 9/2001 | Chao | |
| 6,297,899 B1 | 10/2001 | Romanovsky | |
| 6,298,066 B1 | 10/2001 | Wettroth et al. | |
| 6,301,370 B1 | 10/2001 | Steffens et al. | |
| 6,304,245 B1 | 10/2001 | Groenenboom | |
| 6,307,558 B1 | 10/2001 | Mao | |
| 6,307,663 B1 | 10/2001 | Kowarz | |
| 6,308,144 B1 | 10/2001 | Bronfeld et al. | |
| 6,320,688 B1 | 11/2001 | Westbrook et al. | |
| 6,323,984 B1 | 11/2001 | Trisnadi | |
| 6,333,792 B1 | 12/2001 | Kimura | |
| 6,333,803 B1 | 12/2001 | Kurotori et al. | |
| 6,335,765 B1 | 1/2002 | Daly et al. | |
| 6,335,941 B1 | 1/2002 | Grubb et al. | |
| 6,340,806 B1 | 1/2002 | Smart et al. | |
| 6,356,683 B1 | 3/2002 | Hu et al. | |
| 6,360,042 B1 | 3/2002 | Long | |
| 6,361,173 B1 | 3/2002 | Vlahos et al. | |
| 6,362,817 B1 | 3/2002 | Powers et al. | |
| 6,362,818 B1 | 3/2002 | Gardiner et al. | |
| 6,363,089 B1 | 3/2002 | Fernald et al. | |
| 6,366,721 B1 | 4/2002 | Hu et al. | |
| 6,369,936 B1 | 4/2002 | Moulin | |
| 6,370,312 B1 | 4/2002 | Wagoner et al. | |
| 6,374,011 B1 | 4/2002 | Wagoner et al. | |
| 6,374,015 B1 | 4/2002 | Lin | |
| 6,375,366 B1 | 4/2002 | Kato et al. | |
| 6,381,072 B1 | 4/2002 | Burger | |
| 6,381,385 B1 | 4/2002 | Watley et al. | |
| 6,384,828 B1 | 5/2002 | Arbeiter et al. | |
| 6,388,241 B1 | 5/2002 | Ang | |
| 6,393,036 B1 | 5/2002 | Kato | |
| 6,393,181 B1 | 5/2002 | Bulman et al. | |
| 6,396,994 B1 | 5/2002 | Philipson et al. | |
| 6,404,425 B1 | 6/2002 | Cosman | |
| 6,407,736 B1 | 6/2002 | Regan | |
| 6,411,425 B1 | 6/2002 | Kowarz et al. | |
| 6,421,636 B1 | 7/2002 | Cooper et al. | |
| 6,424,343 B1 | 7/2002 | Deering et al. | |
| 6,429,876 B1 | 8/2002 | Morein | |
| 6,429,877 B1 | 8/2002 | Stroyan | |
| 6,433,823 B1 | 8/2002 | Nakamura et al. | |
| 6,433,838 B1 | 8/2002 | Chen | |
| 6,433,840 B1 | 8/2002 | Poppleton | |
| 6,437,789 B1 | 8/2002 | Tidwell et al. | |
| 6,445,362 B1 | 9/2002 | Tegreene | |
| 6,445,433 B1 | 9/2002 | Levola | |
| 6,449,071 B1 | 9/2002 | Farhan et al. | |
| 6,449,293 B1 | 9/2002 | Pedersen et al. | |
| 6,452,667 B1 | 9/2002 | Fernald et al. | |
| 6,456,288 B1 | 9/2002 | Brockway et al. | |
| 6,466,206 B1 | 10/2002 | Deering | |
| 6,466,224 B1 | 10/2002 | Nagata et al. | |
| 6,470,036 B1 | 10/2002 | Bailey et al. | |
| 6,473,090 B1 | 10/2002 | Mayer | |
| 6,476,848 B2 | 11/2002 | Kowarz et al. | |
| 6,480,513 B1 | 11/2002 | Kapany et al. | |
| 6,480,634 B1 | 11/2002 | Corrigan | |
| 6,490,931 B1 | 12/2002 | Fernald et al. | |
| 6,496,160 B1 | 12/2002 | Tanner et al. | |
| 6,507,706 B1 | 1/2003 | Brazas et al. | |
| 6,510,272 B1 | 1/2003 | Wiegand | |
| 6,511,182 B1 | 1/2003 | Agostinelli et al. | |
| RE37,993 E | 2/2003 | Zhang | |
| 6,519,388 B1 | 2/2003 | Fernald et al. | |
| 6,522,809 B1 | 2/2003 | Takabayashi et al. | |
| 6,525,740 B1 | 2/2003 | Cosman | |
| 6,529,310 B1 | 3/2003 | Huibers et al. | |
| 6,529,531 B1 | 3/2003 | Everage et al. | |
| 6,534,248 B2 | 3/2003 | Jain et al. | |
| 6,538,656 B1 | 3/2003 | Cheung et al. | |
| 6,549,196 B1 | 4/2003 | Taguchi et al. | |
| 6,554,431 B1 | 4/2003 | Binsted et al. | |
| 6,556,627 B2 | 4/2003 | Kitamura et al. | |
| 6,563,968 B2 | 5/2003 | Davis et al. | |
| 6,574,352 B1 | 6/2003 | Skolmoski | |
| 6,575,581 B2 | 6/2003 | Tsurushima | |
| 6,577,429 B1 | 6/2003 | Kurtz et al. | |
| 6,580,430 B1 | 6/2003 | Hollis et al. | |
| 6,591,020 B1 | 7/2003 | Klassen | |
| 6,594,043 B1 | 7/2003 | Bloom et al. | |
| 6,597,363 B1 | 7/2003 | Duluk, Jr. et al. | |
| 6,598,979 B2 | 7/2003 | Yoneno | |
| 6,600,460 B1 * | 7/2003 | Mays, Jr. | 345/7 |
| 6,600,830 B1 | 7/2003 | Lin et al. | |
| 6,600,854 B2 | 7/2003 | Anderegg et al. | |
| 6,603,482 B1 | 8/2003 | Tidwell | |
| 6,643,299 B1 | 11/2003 | Lin | |
| 6,646,645 B1 | 11/2003 | Simmonds et al. | |
| 6,650,326 B1 | 11/2003 | Huber et al. | |
| 6,671,293 B2 | 12/2003 | Kopp et al. | |
| 6,678,085 B2 | 1/2004 | Kowarz et al. | |
| 6,690,655 B1 | 2/2004 | Miner et al. | |
| 6,692,129 B2 | 2/2004 | Gross et al. | |
| 6,711,187 B2 * | 3/2004 | Tanner et al. | 372/30 |
| 6,727,918 B1 | 4/2004 | Nason | |
| 6,738,105 B1 | 5/2004 | Hannah et al. | |

| Patent No. | Date | Inventor |
|---|---|---|
| 6,741,384 B1 | 5/2004 | Martin et al. |
| 6,747,649 B1 | 6/2004 | Sanz-Pastor et al. |
| 6,747,781 B2 | 6/2004 | Trisnadi |
| 6,751,001 B1 | 6/2004 | Tanner et al. |
| 6,760,036 B2 | 7/2004 | Tidwell |
| 6,763,042 B2 | 7/2004 | Williams et al. |
| 6,773,142 B2 | 8/2004 | Rekow |
| 6,776,045 B2 | 8/2004 | Fernald et al. |
| 6,782,205 B2 | 8/2004 | Trisnadi et al. |
| 6,788,304 B1 | 9/2004 | Hart et al. |
| 6,788,307 B2 | 9/2004 | Coleman et al. |
| 6,789,903 B2 | 9/2004 | Parker et al. |
| 6,791,562 B2 | 9/2004 | Cosman et al. |
| 6,798,418 B1 | 9/2004 | Sartori et al. |
| 6,799,850 B2 | 10/2004 | Hong et al. |
| 6,801,205 B2 | 10/2004 | Gardiner et al. |
| 6,809,731 B2 | 10/2004 | Muffler et al. |
| 6,811,267 B1 | 11/2004 | Allen et al. |
| 6,816,169 B2 | 11/2004 | Cosman |
| 6,831,648 B2 | 12/2004 | Mukherjee et al. |
| 6,840,627 B2 | 1/2005 | Olbrich |
| 6,842,298 B1 | 1/2005 | Shafer et al. |
| 6,856,449 B2 | 2/2005 | Winkler et al. |
| 6,868,212 B2 | 3/2005 | DeWitte et al. |
| 6,871,958 B2 | 3/2005 | Streid et al. |
| 6,897,878 B2 | 5/2005 | Cosman et al. |
| 6,943,803 B1 | 9/2005 | Cosman et al. |
| 6,956,582 B2 | 10/2005 | Tidwell |
| 6,956,878 B1 | 10/2005 | Trisnadi |
| 6,971,576 B2 | 12/2005 | Tsikos et al. |
| 6,984,039 B2 | 1/2006 | Agostinelli |
| 6,985,663 B2 | 1/2006 | Catchmark et al. |
| 7,012,669 B2 | 3/2006 | Streid et al. |
| 7,030,883 B2 | 4/2006 | Thompson |
| 7,038,735 B2 | 5/2006 | Coleman et al. |
| 7,043,102 B2 | 5/2006 | Okamoto et al. |
| 7,053,911 B2 | 5/2006 | Cosman |
| 7,053,912 B2 | 5/2006 | Cosman |
| 7,053,913 B2 | 5/2006 | Cosman |
| 7,054,051 B1 | 5/2006 | Bloom |
| 7,091,980 B2 | 8/2006 | Tidwell |
| 7,095,423 B2 | 8/2006 | Cosman et al. |
| 7,110,153 B2 | 9/2006 | Sakai |
| 7,110,624 B2 | 9/2006 | Williams et al. |
| 7,111,943 B2 | 9/2006 | Agostinelli et al. |
| 7,113,320 B2 | 9/2006 | Tanner |
| 7,133,583 B2 | 11/2006 | Marceau et al. |
| 7,193,765 B2 | 3/2007 | Christensen et al. |
| 7,193,766 B2 | 3/2007 | Bloom |
| 7,197,200 B2 | 3/2007 | Marceau et al. |
| 7,210,786 B2 | 5/2007 | Tamura et al. |
| 7,215,840 B2 | 5/2007 | Marceau et al. |
| 7,257,519 B2 | 8/2007 | Cosman |
| 7,267,442 B2 | 9/2007 | Childers et al. |
| 7,277,216 B2 | 10/2007 | Bloom |
| 7,286,277 B2 | 10/2007 | Bloom et al. |
| 7,317,464 B2 | 1/2008 | Willis |
| 7,327,909 B2 | 2/2008 | Marceau et al. |
| 7,334,902 B2 | 2/2008 | Streid et al. |
| 7,354,157 B2 * | 4/2008 | Takeda et al. ................. 353/30 |
| 7,400,449 B2 | 7/2008 | Christensen et al. |
| 7,420,177 B2 | 9/2008 | Williams et al. |
| 2001/0002124 A1 | 5/2001 | Mamiya et al. |
| 2001/0027456 A1 | 10/2001 | Lancaster et al. |
| 2001/0047251 A1 | 11/2001 | Kemp |
| 2002/0005862 A1 | 1/2002 | Deering |
| 2002/0021462 A1 | 2/2002 | Delfyett et al. |
| 2002/0067467 A1 | 6/2002 | Dorval et al. |
| 2002/0071453 A1 | 6/2002 | Lin |
| 2002/0075202 A1 | 6/2002 | Fergason |
| 2002/0101647 A1 | 8/2002 | Moulin |
| 2002/0136121 A1 | 9/2002 | Salmonsen et al. |
| 2002/0145615 A1 | 10/2002 | Moore |
| 2002/0145806 A1 | 10/2002 | Amm |
| 2002/0146248 A1 | 10/2002 | Herman et al. |
| 2002/0154860 A1 | 10/2002 | Fernald et al. |
| 2002/0176134 A1 | 11/2002 | Vohra |
| 2003/0035190 A1 | 2/2003 | Brown et al. |
| 2003/0038807 A1 | 2/2003 | Demos et al. |
| 2003/0039443 A1 | 2/2003 | Catchmark et al. |
| 2003/0048275 A1 | 3/2003 | Ciolac |
| 2003/0081303 A1 | 5/2003 | Sandstrom et al. |
| 2003/0086647 A1 | 5/2003 | Willner et al. |
| 2003/0142319 A1 | 7/2003 | Ronnekleiv et al. |
| 2003/0160780 A1 | 8/2003 | Lefebvre et al. |
| 2003/0174312 A1 | 9/2003 | Leblanc |
| 2003/0214633 A1 * | 11/2003 | Roddy et al. ................. 353/31 |
| 2003/0235304 A1 | 12/2003 | Evans et al. |
| 2004/0017518 A1 * | 1/2004 | Stern et al. ................. 348/744 |
| 2004/0085283 A1 | 5/2004 | Wang |
| 2004/0136074 A1 | 7/2004 | Ford et al. |
| 2004/0165154 A1 | 8/2004 | Kobori et al. |
| 2004/0179007 A1 | 9/2004 | Bower et al. |
| 2004/0183954 A1 | 9/2004 | Hannah et al. |
| 2004/0207618 A1 | 10/2004 | Williams et al. |
| 2005/0018309 A1 | 1/2005 | McGuire, Jr. et al. |
| 2005/0024722 A1 | 2/2005 | Agostinelli et al. |
| 2005/0047134 A1 * | 3/2005 | Mueller et al. ............... 362/231 |
| 2005/0093854 A1 | 5/2005 | Kennedy et al. |
| 2005/0243389 A1 | 11/2005 | Kihara |
| 2006/0114544 A1 | 6/2006 | Bloom et al. |
| 2006/0176912 A1 | 8/2006 | Anikitchev |
| 2006/0221429 A1 | 10/2006 | Christensen et al. |
| 2006/0238851 A1 | 10/2006 | Bloom |
| 2006/0255243 A1 | 11/2006 | Kobayashi et al. |
| 2007/0183473 A1 * | 8/2007 | Bicknell et al. ........ 372/50.121 |

FOREIGN PATENT DOCUMENTS

| | | |
|---|---|---|
| DE | 197 21 416 | 1/1999 |
| EP | 0 155 858 | 9/1985 |
| EP | 0 306 308 | 3/1989 |
| EP | 0 319 165 | 7/1989 |
| EP | 0 417 039 | 3/1991 |
| EP | 0 480 570 | 4/1992 |
| EP | 0 488 326 | 6/1992 |
| EP | 0 489 594 | 6/1992 |
| EP | 0 528 646 | 2/1993 |
| EP | 0 530 760 | 3/1993 |
| EP | 0 550 189 | 7/1993 |
| EP | 0 610 665 | 8/1994 |
| EP | 0 621 548 | 10/1994 |
| EP | 0 627 644 | 12/1994 |
| EP | 0 627 850 | 12/1994 |
| EP | 0 643 314 | 3/1995 |
| EP | 0 654 777 | 5/1995 |
| EP | 0 658 868 | 6/1995 |
| EP | 0 689 078 | 12/1995 |
| EP | 0 801 319 | 10/1997 |
| EP | 0 880 282 | 11/1998 |
| EP | 1 365 584 | 11/2003 |
| GB | 2 118 365 | 10/1983 |
| GB | 2 144 608 | 3/1985 |
| GB | 2 179 147 | 2/1987 |
| GB | 2 245 806 | 1/1992 |
| GB | 2 251 770 | 7/1992 |
| GB | 2 251 773 | 7/1992 |
| GB | 2 266 385 | 10/1993 |
| GB | 2 293 079 | 3/1996 |
| JP | 63-305323 | 12/1988 |
| JP | 2-219092 | 8/1990 |
| JP | 2000-305481 | 11/2000 |
| WO | 87/01571 | 3/1987 |
| WO | 92/12506 | 7/1992 |
| WO | 93/02269 | 2/1993 |
| WO | 93/09472 | 5/1993 |

| | | |
|---|---|---|
| WO | 93/18428 | 9/1993 |
| WO | 95/11473 | 4/1995 |
| WO | 95/27267 | 10/1995 |
| WO | 96/41217 | 12/1996 |
| WO | 96/41224 | 12/1996 |
| WO | 97/26569 | 7/1997 |
| WO | 98/15127 | 4/1998 |
| WO | 01/46248 | 6/2001 |
| WO | 01/57581 | 8/2001 |
| WO | 02/12925 | 2/2002 |
| WO | 02/23824 | 3/2002 |
| WO | 02/31575 | 4/2002 |
| WO | 03/001281 | 1/2003 |

OTHER PUBLICATIONS

Akeley, "RealityEngine Graphics," Computer Graphics Proceedings, Annual Conference Series, 1993.

Allen, J. et al., "An Interactive Learning Environment for VLSI Design," Proceedings of the IEEE, Jan. 2000, pp. 96-106, vol. 88, No. 1.

Allen, W. et al., "47.4: Invited Paper: Wobulation: Doubling the Addressed Resolution of Projection Displays," SID 05 Digest, 2005, pp. 1514-1517.

Amm, et al., "5.2: Grating Light Valve™ Technology: Update and Novel Applications," Presented at Society for Information Display Symposium, May 19, 1998, Anaheim, California.

Apgar et al., "A Display System for the Stellar™ Graphics Supercomputer Model GS1000™," Computer Graphics, Aug. 1988, pp. 255-262, vol. 22, No. 4.

Baer, Computer Systems Architecture, 1980, Computer Science Press, Inc., Rockville, Maryland.

Barad et al., "Real-Time Procedural Texturing Techniques Using MMX," Gamasutra, May 1, 1998, http://www.gamasutra.com/features/19980501/mmxtexturing_01.htm.

Bass, "4K GLV Calibration," E&S Company, Jan. 8, 2008.

Becker et al., "Smooth Transitions between Bump Rendering Algorithms," Computer Graphics Proceedings, 1993, pp. 183-189.

Bishop et al., "Frameless Rendering: Double Buffering Considered Harmful," Computer Graphics Proceedings, Annual Conference Series, 1994.

Blinn, "Simulation of Wrinkled Surfaces," Siggraph '78 Proceedings, 1978, pp. 286-292.

Blinn, "A Trip Down the Graphics Pipeline: Subpixelic Particles," IEEE Computer Graphics & Applications, Sep./Oct. 1991, pp. 86-90, vol 11, No. 5.

Blinn et al., "Texture and Reflection in Computer Generated Images," Communications of the ACM, Oct. 1976, pp. 542-547, vol. 19, No. 10.

Boyd et al., "Parametric Interaction of Focused Gaussian Light Beams," Journal of Applied Physics, Jul. 1968, pp. 3597-3639vol. 39, No. 8.

Brazas et al., "High-Resolution Laser-Projection Display System Using a Grating Electromechanical System (GEMS)," MOEMS Display and Imaging Systems II, Proceedings of SPIE, 2004, pp. 65-75vol. 5348.

Bresenham, "Algorithm for computer control of a digital plotter," IBM Systems Journal, 1965, pp. 25-30, vol. 4, No. 1.

Carlson, "An Algorithm and Data Structure for 3D Object Synthesis Using Surface Patch Intersections," Computer Graphics, Jul. 1982, pp. 255-263, vol. 16, No. 3.

Carpenter, "The A-buffer, an Antialiased Hidden Surface Method," Computer Graphics, Jul. 1984, pp. 103-108, vol. 18, No. 3.

Carter, "Re: Re seams and creaseAngle (long)," posted on the GeoVRML.org website Feb. 2, 2000, http://www.ai.sri.com/geovrml/archive/msg00560.html.

Catmull, "An Analytic Visible Surface Algorithm for Independent Pixel Processing," Computer Graphics, Jul. 1984, pp. 109-115, vol. 18, No. 3.

Chasen, Geometric Principles and Procedures for Computer Graphic Applications, 1978, pp. 11-123, Upper Saddle River, New Jersey.

Choy et al., "Single Pass Algorithm for the Generation of Chain-Coded Contours and Contours Inclusion Relationship," Communications, Computers and Signal Processing—IEEE Pac Rim '93, 1993, pp. 256-259.

Clark et al., "Photographic Texture and CIG: Modeling Strategies for Production Data Bases," 9th VITSC Proceedings, Nov. 30-Dec. 2, 1987, pp. 274-283.

Corrigan et al., "Grating Light Valve™ Technology for Projection Displays," Presented at the International Display Workshop—Kobe, Japan, Dec. 9, 1998.

Crow, "Shadow Algorithms for Computer Graphics," Siggraph '77, Jul. 20-22, 1977, San Jose, California, pp. 242, 248.

Deering et al., "FBRAM: A new Form of Memory Optimized for 3D Graphics," Computer Graphics Proceedings, Annual Conference Series, 1994.

Drever et al., "Laser Phase and Frequency Stabilization Using an Optical Resonator," Applied Physics B: Photophysics and Laser Chemistry, 1983, pp. 97-105, vol. 31.

Duchaineau et al., "ROAMing Terrain: Real-time Optimally Adapting Meshes," Los Alamos National Laboratory and Lawrence Livermore National Laboratory, 1997.

Duff, "Compositing 3-D Rendered Images," Siggraph '85, Jul. 22-26, 1985, San Francisco, California, pp. 41-44.

Faux et al., Computational Geometry for Design and Manufacture, 1979, Ellis Horwood, Chicester, United Kingdom.

Feiner et al., "Dial: A Diagrammatic Animation Language," IEEE Computer Graphics & Applications, Sep. 1982, pp. 43-54, vol. 2, No. 7.

Fiume et al., "A Parallel Scan Conversion Algorithm with Anti-Aliasing for a General-Purpose Ultracomputer," Computer Graphics, Jul. 1983, pp. 141-150, vol. 17, No. 3.

Foley et al., Computer Graphics: Principles and Practice, 2nd ed., 1990, Addison-Wesley Publishing Co., Inc., Menlo Park, California.

Foley et al., Fundamentals of Interactive Computer Graphics, 1982, Addison-Wesley Publishing Co., Inc., Menlo Park, California.

Fox et al., "Development of Computer-Generated Imagery for a Low-Cost Real-Time Terrain Imaging System," IEEE 1986 National Aerospace and Electronic Conference, May 19-23, 1986, pp. 986-991.

Gambotto, "Combining Image Analysis and Thermal Models for Infrared Scene Simulations," Image Processing Proceedings, ICIP-94, IEEE International Conference, 1994, vol. 1, pp. 710-714.

Gardiner, "A Method for Rendering Shadows," E&S Company, Sep. 25, 1996.

Gardiner, "Shadows in Harmony," E&S Company, Sep. 20, 1996.

Gardner, "Simulation of Natural Scenes Using Textured Quadric Surfaces," Computer Graphics, Jul. 1984, pp. 11-20, vol. 18, No. 3.

Gardner, "Visual Simulation of Clouds," Siggraph '85, Jul. 22-26, 1985, San Francisco, California, pp. 297-303.

Giloi, Interactive Computer Graphics: Data Structures, Algorithms, Languages, 1978, Prentice-Hall, Inc., Englewood Cliffs, New Jersey.

Glaskowsky, "Intel Displays 740 Graphics Chip: Auburn Sets New Standard for Quality—But Not Speed," Microprocessor Report, Feb. 16, 1998, pp. 5-9, vol. 12, No. 2.

Goshtasby, "Registration of Images with Geometric Distortions," IEEE Transactions on Geoscience and Remote Sensing, Jan. 1988, pp. 60-64, vol. 26, No. 1.

Great Britain Health & Safety Executive, The Radiation Safety of Lasers Used for Display Purposes, Oct. 1996.

Gupta et al., "Filtering Edges for Gray-Scale Displays," Computer Graphics, Aug. 1981, pp. 1-5, vol. 15, No. 3.

Gupta et al., "A VLSI Architecture for Updating Raster-Scan Displays," Computer Graphics, Aug. 1981, pp. 71-78, vol. 15, No. 3.

Stevens et al., "The National Simulation Laboratory: The Unifying Tool for Air Traffic Control System Development," Proceedings of the 1991 Winter Simulation Conference, 1991, pp. 741-746.

Stone, High-Performance Computer Architecture, 1987, pp. 278-330, Addison-Wesley Publishing Company, Menlo Park, California.

Tanner et al., "The Clipmap: A Virtual Mipmap," Silicon Graphics Computer Systems; Proceedings of the 25th Annual Conference on Computer Graphics and Interactive Techniques, Jul. 1998.

Tanriverdi et al., "Interacting with Eye Movements in Virtual Environments," CHI Letters, Apr. 2000, pp. 265-272, vol. 2, No. 1.

Texas Instruments, DLP® 3-D HDTV Technology, 2007.
Torborg et al., "Talisman: Commodity Realtime 3D Graphics for the PC," Computer Graphics Proceedings, Annual Conference Series, 1996, pp. 353-363.
Trisnadi, "Hadamard speckle contrast reduction," Optics Letters, 2004, vol. 29, pp. 11-13.
Trisnadi et al., "Overview and applications of Grating Light Valve™ based optical write engines for high-speed digital imaging," proceedings of conference "MOEMS Display and Imaging SYstems II," Jan. 2004, vol. 5328, 13 pages.
Whitton, "Memory Design for Raster Graphics Displays," IEEE Computer Graphics & Applications, Mar. 1984, pp. 48-65.
Williams, "Casting Curved Shadows on Curved Surfaces," Computer Graphics Lab, New York Institute of Technology, 1978, pp. 270-274.
Williams, "Pyramidal Parametrics," Computer Graphics, Jul. 1983, pp. 1-11, vol. 17, No. 3.
Willis et al., "A Method for Continuous Adaptive Terrain," Presented at the 1996 Image Conference, Jun. 23-28, 1996.
Woo et al., "A Survey of Shadow Algorithms," IEEE Computer Graphics & Applications, Nov. 1990, pp. 13-32, vol. 10, No. 6.
Wu et al., "A Differential Method for Simultaneous Estimation of Rotation, Change of Scale and Translation," Signal Processing: Image Communication, 1990, pp. 69-80, vol. 2, No. 1.
Youbing et al., "A Fast Algorithm for Large Scale Terrain Walkthrough," CAD/Graphics, Aug. 22-24, 2001, 6 pages.
Sollberger et al., "Frequency Stabilization of Semiconductor Lasers for Applications in Coherent Communication Systems," Journal of Lightwave Technology, Apr. 1987, pp. 485-491, vol. LT-5, No. 4.
Hearn et al., Computer Graphics, 2nd ed., 1994, pp. 143-183.
Heckbert, "Survey of Texture Mapping," IEEE Computer Graphics and Applications, Nov. 1986, pp. 56-67.
Heckbert, "Texture Mapping Polygons in Perspective," New York Institute of Technology, Computer Graphics Lab, Technical Memo No. 13, Apr. 28, 1983.
Heidrich et al., "Applications of Pixel Textures in Visualization and Realistic Image Synthesis," Symposium on INteractive 3D Graphics, 1990, pp. 127-135, Atlanta, Georgia.
Holten-Lund, Design for Scalability in 3D Computer Graphics Architectures, Ph.D. thesis, Computer Science sand Technology Informatics and Mathematical Modelling, Technical University of Denmark, Jul. 2001.
INTEL740 Graphics Accelerator Datasheet, Apr. 1998.
INTEL470 Graphics Accelerator Datasheet, Architectural Overview, at least as early as Apr. 30, 1998.
Jacob, "Eye Tracking in Advanced Interface Design," ACM, 1995.
Kelley et al., "Hardware Accelerated Rendering of CSG and Transparency," Siggraph '94, in Computer Graphics Proceedings, Annual Conference Series, 1994, pp. 177-184.
Klassen, "Modeling the Effect of the Atmosphere on Light," ACM Transactions on Graphics, Jul. 1987, pp. 215-237, vol. 6, No. 3.
Kleiss, "Tradeoffs Among Types of Scene Detail for Simulating Low-Altitude Flight," University of Dayton Research Institute, Aug. 1, 1992, pp. 1141-1146.
Lewis, "Algorithms for Solid Noise Synthesis," Siggraph '89, Computer Graphics, Jul. 1989, pp. 263-270, vol. 23, No. 3.
Lindstrom et al., "Real-Time, Continuous Level of Detail Rendering of Height Fields," Siggraph '96, Aug. 1996.
McCarty et al., "A Virtual Cockpit for a Distributed Interactive Simulation," IEEE Computer Graphics & Applications, Jan. 1994, pp. 49-54.
Microsoft Flight Simulator 2004, Aug. 9, 2000. http://www.microsoft.com/games/flightsimulator/fs2000_devdesk.sdk.asp.
Miller et al., "Illumination and Reflection Maps: Simulated Objects in Simulated and Real Environments," Siggraph '84, Course Notes for Advances Computer Graphics Animation, Jul. 23, 1984.
Mitchell, "Spectrally Optimal Sampling for Distribution Ray Tracing," Siggraph '91, Computer Graphics, Jul. 1991, pp. 157-165, vol. 25, No. 4.
Mitsubishi Electronic Device Group, "Overview of 3D-RAM and Its Functional Blocks," 1995.

Montrym et al., "InfiniteReality: A Real-Time Graphics System," Computer Graphics Proceedings, Annual Conference Series, 1997.
Mooradian et al., "High Power Extended Vertical Cavity Surface Emitting Diode Lasers and Arrays and Their Applications," Micro-Optics Conference, Tokyo, Nov. 2, 2005.
Musgrave et al., "The Synthesis and Rendering of Eroded Fractal Terrains," Siggraph '89, Computer Graphics, Jul. 1989, pp. 41-50, vol. 23, No. 3.
Nakamae et al., "Compositing 3D Images with Antialiasing and Various Shading Effects," IEEE Computer Graphics & Applications, Mar. 1989, pp. 21-29, vol. 9, No. 2.
Newman et al., Principles of Interactive Computer Graphics, 2nd ed., 1979, McGraw-Hill Book Company, San Francisco, California.
Niven, "Trends in Laser Light Sources for Projection Display," Novalux International Display Workshop, Session LAD2-2, Dec. 2006.
Oshima et al., "An Animation Design Tool Utilizing Texture," International Workshop on Industrial Applications of Machine Intelligence and Vision, Tokyo, Apr. 10-12, 1989, pp. 337-342.
Parke, "Simulation and Expected Performance Analysis of Multiple Processor Z-Buffer Systems," Computer Graphics, 1980, pp. 48-56.
Peachey, "Solid Texturing of Complex Surfaces," Siggraph '85, 1985, pp. 279-286, vol. 19, No. 3.
Peercy et al., "Efficient Bump Mapping Hardware," Computer Graphics Proceedings, 1997.
Perlin, "An Image Synthesizer," Siggraph '85, 1985, pp. 287-296, vol. 19, No. 3.
Pineda, "A Parallel Algorithm for Polygon Rasterization," Siggraph '88, Aug. 1988, pp. 17-20, vol. 22, No. 4.
Porter et al., "Compositing Digital Images," Siggraph '84, Computer Graphics, Jul. 1984, pp. 253-259, vol. 18, No. 3.
Poulton et al., "Breaking the Frame-Buffer Bottleneck with Logic-Enhanced Memories," IEEE Computer Graphics & Applications, Nov. 1992, pp. 65-74.
Reeves et al., "Rendering Antialiased Shadows with Depth Maps," Siggraph '87, Computer Graphics, Jul. 1987, pp. 283-291, vol. 21, No. 4.
Regan et al., "Priority Rendering with a Virtual Reality Address Recalculation Pipeline," Computer Graphics Proceedings, Annual Conference Series, 1994.
Rhoades et al., "Real-Time Procedural Textures," ACM, Jun. 1992, pp. 95-100, 225.
Rockwood et al., "Blending Surfaces in Solid Modeling," Geometric Modeling: Algorithms and New Trends, 1987, pp. 367-383, Society for Industrial and Applied Mathematics, Philadelphia, Pennsylvania.
Röttger et al., "Real-Time Generation of Continuous Levels of Detail for Height Fields," WSCG '98, 1998.
Saha et al., "Web-based Distributed VLSI Design," IEEE, 1997, pp. 449-454.
Salzman et al., "VR's Frames of Reference: A Visualization Technique for Mastering Abstract Multidimensional Information," CHI 99 Papers, May 1999, pp. 489-495.
Sandejas, Silicon Microfabrication of Grating Light Valves, Doctor of Philosophy Dissertation, Stanford University, Jul. 1995.
Scarlatos, "A Refined Triangulation Hierarchy for Multiple Levels of Terrain Detail," presented at the Image V Conference, Phoenix, Arizona, Jun. 19-22, 1990, pp. 114-122.
Schilling, "A New Simple and Efficient Antialiasing with Subpixel Masks," Siggraph '91, Computer Graphics, Jul. 1991, pp. 133-141, vol. 25, No. 4.
Schumacker, "A New Visual System Architecture," Proceedings of the Second Interservices/Industry Training Equipment Conference, Nov. 18-20, 1990, Salt Lake City, Utah.
Segal et al., "Fast Shadows and Lighting Effects Using Texture Mapping," Siggraph '92, Computer Graphics, Jul. 1992, pp. 249-252, vol. 26, No. 2.
Sick AG, S3000 Safety Laser Scanner Operating Instructions, Aug. 25, 2005.
Silicon Light Machines, "White Paper: Calculating Response Characteristics for the 'Janis' GLV Module, Revision 2.0," Oct. 1999.

* cited by examiner

SYSTEM AND METHOD FOR ALIGNING RGB LIGHT IN A SINGLE MODULATOR PROJECTOR

CROSS-REFERENCE TO RELATED APPLICATIONS

This application claims the benefit of U.S. Provisional Application No. 60/874,605, filed Dec. 12, 2006 which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND

1. The Field of the Invention

The present invention relates generally to visual display devices, and more particularly, but not necessarily entirely, to visual display devices containing light modulating devices.

2. Description of Background Art

Dynamic video displays are becoming ubiquitous in modern society. Such video displays are used to display information in a wide variety of settings providing, inter alia, education and entertainment. There have been several recent promised enhancements to dynamic video display technologies including: increased resolution, increased contrast, increased brightness levels, reduced "screen door" effects as well as other characteristics which improve the overall quality of images produced with dynamic video display systems.

Technologies used to produce dynamic video displays include: Texas Instruments' DLP® projector using a digital micromirror device ("DMD"), Sony's SXRD® and JVC's D-ILA® which incorporate liquid crystal on silicon ("LCOS") technology, Kodak's grating electromechanical system ("GEMS") as well as systems using grating light valve ("GLV") technology. All of these particular technologies differ in the devices which are used to modulate the light which is projected, and such modulation devices are the core of each system and the component to which the rest of the system components surrounding them are designed.

In DMD based projectors, an image is created by microscopic mirrors laid out in a two-dimensional matrix on a semiconductor chip. Each mirror represents one pixel in a frame of the projected image. The number of mirrors corresponds to the resolution of the projected image, i.e., 800×600, 1024×768, 1280×720 and 1920×1080 (HDTV) matrices are some common DMD resolutions. Each mirror can be tilted rapidly to reflect light either through the lens or onto a heatsink also called a light dump.

In DMD based projectors, the rapid tilting of the mirrors (essentially switching between "on" and "off" states) allows the DMD to vary the intensity of the light being reflected out through the lens, using pulse width modulation to create shades of grey in addition to white (white being projected in "on" position) and black (being projected in the "off" position). Disadvantageously, DMD based projectors are susceptible to a "screen door" effect which is commonly described as viewing an image through a screen door. The undesirable effect is due to the fact that the individual micro-mirrors have gaps between them. These gaps between the micro-mirrors cause gaps between the displayed pixels to become more visible as the individual/viewer comes closer to the displayed image and as the displayed pixels become larger.

In one previously available projection system, only a single DMD chip is utilized. Colors are produced by placing a spinning color wheel in the optical path between a lamp and the DMD chip. The color wheel may be divided up into three or more color filters, namely, red, green and blue. The DMD chip is synchronized with the rotating motion of the color wheel so that the red component is projected onto the DMD when the red filter is in front of the lamp. The same is true for the operation of the green and blue filters. The red, green and blue images are thus displayed frame sequentially at a sufficiently high rate that the observer sees a full color image. It will thus be appreciated that while the red, green and blue light components are temporally spaced from each other in a single DMD based system due to the use of the color wheel, that the red, green and blue light components are not spatially separated on the DMD chip. That is, each red, green and blue component of light is incident upon all of the mirrors of a DMD chip but at separate times due to the use of the color wheel.

The GEMS and the GLV technologies are similar to each other in respect that they both consist of tiny silicon-ribbons that diffract light into multiple orders. GLV technology uses two or more ribbons to form a pixel as a very finely focused column of light that is shined vertically across these ribbons. The vertically diffracted orders of light are gathered, scanned and sent through an imaging lens and thereafter they appear on a screen. Exemplary GLV based light modulation devices are described in U.S. Pat. Nos. 5,311,360 and 5,841,579, which are both incorporated herein by reference in their entireties.

In the previously available GLV based systems, three separate GLV chips, one each for red, green, and blue light sources, are utilized to form images by superimposing the colors. One such exemplary system is described in U.S. Pat. No. 6,692,129, which is hereby incorporated by reference in its entirety.

GEMS technology is similar to GLV technology except the silicon ribbons used are much longer and are suspended between multiple posts and light is diffracted horizontally (parallel to the ribbons), whereas the GLV ribbons are typically only suspended between two support posts and light is diffracted vertically (perpendicular to the ribbons). In the previously available GEMS based systems, three separate GEMS chips, one each for red, green and blue light sources, are utilized to form images.

Imaging systems using LCOS technology essentially combine the "transmissive technology" used in a liquid crystal display ("LCD"), where light is modulated by liquid crystals as it passes through various layers of materials—some of which are polarized—on its way to a lens, and the "reflective technology" used in DMD based systems where light is reflected in an "on" and "off" manner. Essentially LCOS systems are a reflective technology that uses liquid crystals instead of mirrors wherein these liquid crystals are applied to a reflective substrate. As these liquid crystals "open" and "close," light is reflected from the reflective substrate below. LCOS-based projection systems typically use three LCOS chips, one each to modulate light in the red, green and blue channels. In this respect it is similar to an LCD-based projector which uses three LCD panels. Because they cannot operate fast enough when operating in a sequential fashion, both LCOS and LCD projectors deliver the red, green and blue components of light to the screen simultaneously. Since LCOS and LCD chips cannot operate fast enough, there is no spinning color wheel used in these projectors as there is in single-chip DMD based projectors.

Thus, typical GLV, LCOS, and GEMS based projectors will use three modulators, such modulators customarily being referred to as "chips," to modulate light in the red, green and blue channels, which are combined to deliver light simultaneously to a screen. This arrangement is similar to LCD projectors which uses three LCD panels.

As explained above, typical DMD based systems often differ in that a single-chip modulator is used with a color wheel, which delivers red, green and blue light to the single-chip and then to a screen in a color sequential manner. This DMD technology is susceptible to color separation, also known as the rainbow effect, where light or white images that are in motion on a dark background appear to have a rainbow or shadow of colors following the image. This rainbow effect is partially caused by the fact that a DMD based system use field sequential imaging. While a single-chip DMD modulator has the mentioned disadvantages, the advantages of using a single-chip modulator are lighter and smaller packaging, fewer components and circuitry, and reduced cost.

DMD based systems have made improvements to its color rendition by sometimes adding an additional set of red, green and blue filters to its color wheel and improving the rotational speed of the wheel to help reduce the visible effects of color separation to some of the population viewing the image, however, it does not eliminate the problem altogether. In the past, other technologies, e.g., LCD, LCOS, GEMS and GLV, avoided the problem of color separation by using three separate modulators, one for each color, so the entire image being displayed from frame to frame was not separated color sequentially as with a color wheel. All three colors can be in the "on" position at the same time producing a white pixel. When white or light pixels are being displayed on a dark or black background color separation is minimized or does not occur.

In addition to color separation problems, some technologies, and particularly technologies based upon LCDs, display an undesirable characteristic called color divergence and is due to misalignment of the three modulators. Color divergence is essentially having one side of a white pixel one color and the other side another color such as red and blue.

As mentioned, in the previously available devices, it was common to use three light modulating devices, one for each color, and also to use a single light modulating device to display the entire image, or field sequentially, with a single color before switching to the next color. However, the use of three light modulating devices increases the cost, weight, power requirements and complexity of the projection system.

In view of the foregoing, it is noteworthy that none of the known prior art provides a projection system that scans full-color sequentially, column by column. The available art is thus characterized by several disadvantages that are addressed by the present disclosure. The present disclosure minimizes, and in some aspects eliminates, the above-mentioned failures, and other problems, by utilizing the methods and structural features described herein.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
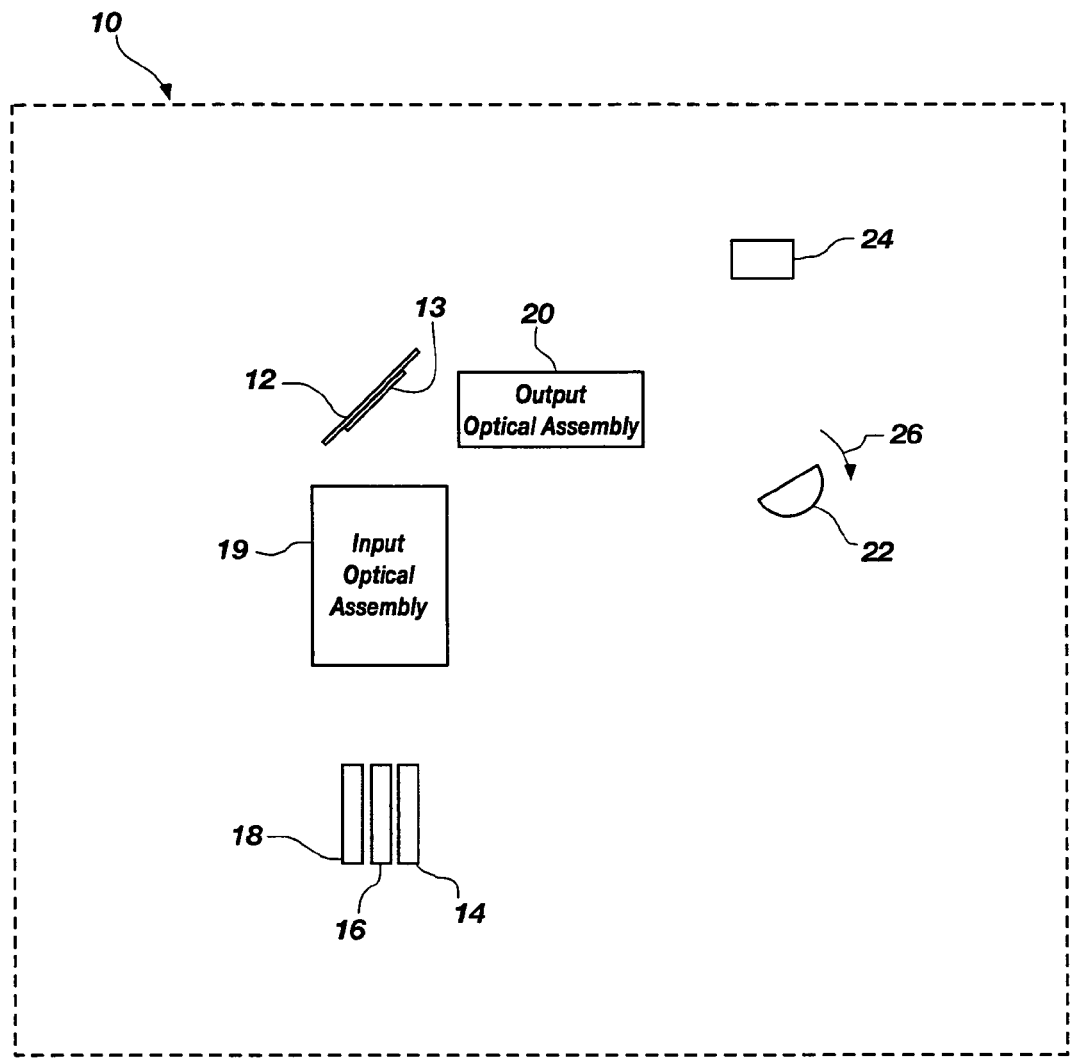
FIG. 1 illustrates a projection system according to an embodiment of the present invention.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

The publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supercedes said reference materials. The reference materials discussed herein are provided solely for their disclosure prior to the filing date of the present application. Nothing herein is to be construed as a suggestion or admission that the inventors are not entitled to antedate such disclosure by virtue of prior invention or disclosure, or to distinguish the present disclosure from the subject matter disclosed in the reference materials.

It must be noted that, as used in this specification and the appended claims, the singular forms "a," "an," and "the" include plural referents unless the context clearly dictates otherwise. In describing and claiming the present disclosure, the following terminology will be used in accordance with the definitions set out below. As used herein, the terms "comprising," "including," "containing," "having," "characterized by,"

and grammatical equivalents thereof are inclusive or open-ended terms that do not exclude additional, unrecited elements or method steps.

Embodiments of the present invention described herein relate to a novel system and method for using a one-dimensional light modulation device to form a two-dimensional image. In one illustrative embodiment, the present invention includes a single light modulation device and multiple laser light sources emitting light having different wavelengths, e.g., red, green and blue light. Each of the multiple laser light sources may also emit a range of wavelengths of light. Each of the different wavelengths of light, or ranges of wavelengths, are spatially and temporally spaced onto the light modulation device. That is, each different wavelength of light, or ranges of wavelengths of light, may be centered onto a unique and distinct location on the light modulation device.

Further, each different wavelength of light may be emitted in pulses at separate times, i.e., temporally spaced, such that only one wavelength or color of light is incident upon the light modulation device at one time. The temporal spacing of the pulses of different wavelengths or colors allows the light modulation device sufficient time to reconfigure to receive the next light pulse.

Although the light pulses of different wavelengths, or ranges of wavelengths, are spatially and temporally separated on the light modulation device, the use of an oscillating or continuously rotating scanning mirror causes the modulated pulses of light to be centered on the same location on an imaging surface. If the oscillating mirror was held stationary, each different wavelength of light would form an image column centered on a different area of the screen, with some possible overlap between adjacent columns. However, because of the use of a scanning mirror, the different wavelengths of light, or ranges of wavelengths of light, that are temporally and spatially separated on the light modulation device are centered onto the same linear element of a two-dimensional image. That is, one-dimensional images from the different light sources are now spatially centered on the same linear element of the two-dimensional image, albeit at different times, even though the one-dimensional images are formed on different physical locations on the light modulation device. It will be appreciated by those having ordinary skill in the art that a significant benefit of physically offsetting the different wavelengths of light, or ranges of wavelengths of light, on the light modulation device is the ability to sequentially form, in full color, linear elements of a two-dimensional image with a significant reduction in the "rainbow effect" caused by the temporal spacing of the light pulses.

An exemplary method of the present invention involves providing a projection system consisting of a plurality of light sources of different colors that is able to pulse different wavelengths or colors of light, or ranges of wavelengths of light. Such a method can use three sources of pulsed light including: red, green and blue light. Essentially, each different colored light pulse is aligned and spaced on the modulator at a certain distance from the other pulses of light. When the modulated light pulses are scanned across a surface, they will be synchronized in such a manner as to cause related light pulses to land on a single point/column of a screen, thus creating an image with no color separation.

Referring now to FIG. 1, there is shown an illustrative embodiment of a projection system 10 in accordance with the principles of the present invention. The projection system 10 comprises a light modulation device 12, a red light source 14, a green light source 16, and a blue light source 18, an input optical assembly 19, an output optical assembly 20, a scanning mirror 22, and a projection lens 24.

The light modulation device 12 is a one-dimensional light modulating device having a light modulating surface 13. The light modulation device 12 may be in the form of a microchip or chip as is known to those having ordinary skill in the art. In operation, light from the red light source 14, the green light source 16, and the blue light source 18 is incident on the light modulating surface 13 of the light modulation device 12. The light modulation surface 13 may comprise a grating light valve (GLV) having a plurality of elongated elements, such as ribbons, suspended between a pair of posts and above a substrate. The substrate may comprise a conductor. In operation, the ribbons (not explicitly shown in FIG. 1) operate to produce modulated light selected from a reflection mode and a diffraction mode, or alternatively, a reflection mode and an interference mode. Alternatively, the light modulation surface 13 may comprise other microelectromechanical structures for modulating light.

Figure 8:
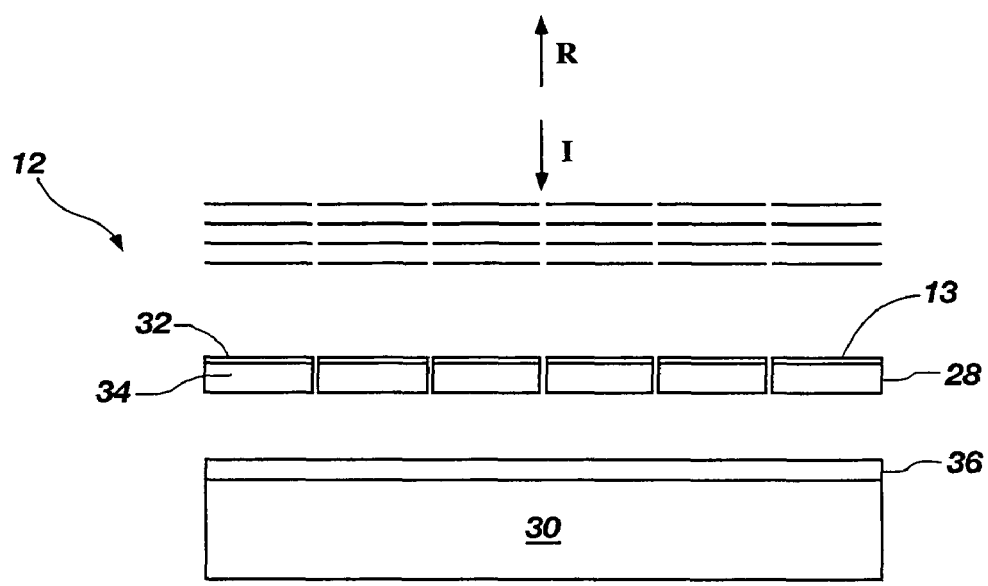
FIG. 8 illustrates a cross-section of a light modulation device in a reflection mode.
Figure 9:
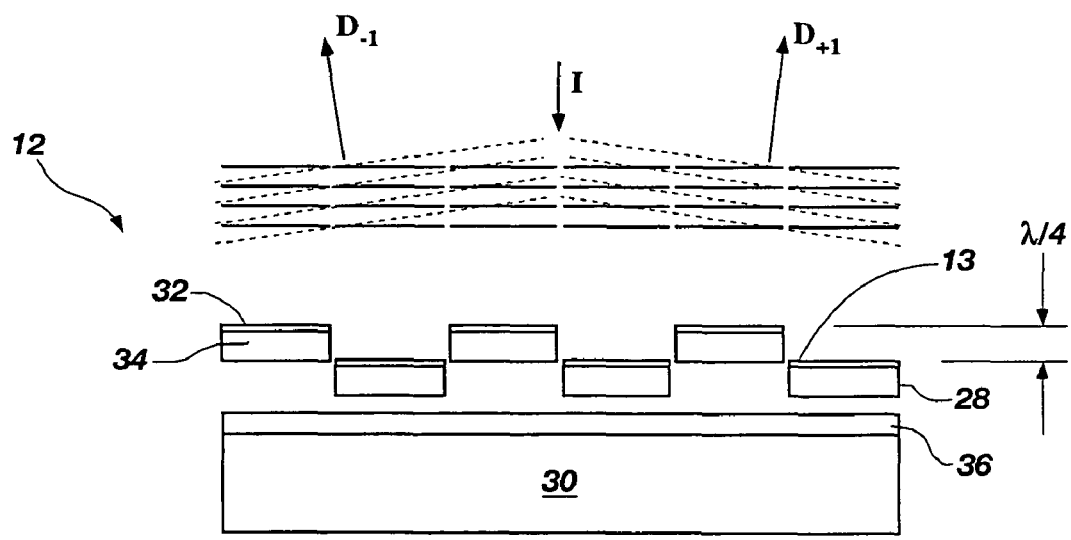
FIG. 9 illustrates a cross-section of a light modulation device in a diffraction mode.

Referring now to FIG. 8 and FIG. 9, there are depicted cross-sectional side views of a suitable light modulation device 12. Elongated elements 28 are suspended above a substrate 30. The elongated elements 28 each comprises a conducting and reflective surface 32 and a resilient material 34. The collective reflective surfaces 32 of the elongated elements 28 form the light modulating surface 13 (also represented at 13 in FIG. 1). The surface of the substrate 30 includes a conductor 36.

FIG. 8 depicts the light modulating surface 13 of the light modulation device 12 in the reflection mode. In the reflection mode, the conducting and reflecting surfaces 32 of the elongated elements 28 form a plane so that incident light I reflects from the elongated elements 28 to produce reflected light R.

FIG. 9 depicts the light modulating surface 13 of the light modulation device 12 in the diffraction mode. In the diffraction mode, an electrical bias causes alternate ones of the elongated elements 28 to move toward the substrate 30. The electrical bias is applied between the reflecting and conducting surfaces 32 of the alternate ones of the elongated elements 28 and the conductor 36. The electrical bias results in a height difference of a quarter wavelength of the incident light I between the alternate ones of the elongated elements 28 and the non-biased ones of the elongated elements 28. The height difference of the quarter wavelength produces diffracted light including plus and minus one diffraction orders, $D_{-1}$ and $D_{+1}$.

FIG. 8 and FIG. 9 depict the light modulation device 12 in the reflection and diffraction modes, respectively. For a deflection of the alternate ones of the elongated elements 28 of less than a quarter wavelength, the incident light I both reflects and diffracts producing the reflected light R and the diffracted light including the plus one and minus one diffraction orders, $D_{-1}$ and $D_{+1}$. Stated another way, by deflecting the alternate ones of the elongated elements 28 less than the quarter wavelength, the light modulation device 12 produces a variable reflectivity, which provides a grayscale effect in display applications.

While FIGS. 8 and 9 depict the light modulation device 12 having six elongated elements 28, the light modulation device 12 preferably includes more of the elongated elements 28. By providing more of the elongated elements 28, the elongated elements 28 are able to function as groups, which are referred to as pixels. Each pixel is a group of two of the elongated elements 28. Alternatively, each pixel is a group of more elongated elements 28.

Referring again to FIG. 1, the red light source 14, the green light source 16, and the blue light source 18 may be laser light sources that have the ability to emit pulsed laser light. The pulsed light from the red light source 14, the green light source 16, and the blue light source 18 is directed onto the modulating surface 13 of the light modulation device 12 by the input optical assembly 19. Thus, one function of the input optical assembly 19 is to uniformly illuminate the light modulation device 12 across all of the pixels such that each pixel has the same intensity of incident light thereon. A second function of the input optical assembly 19 is to focus the light to a narrow beam width in the direction perpendicular to the array of ribbons. The input optical assembly 19 should therefore create a column of light that is anamorphic, or longer that it is wide, that has a uniform distribution along its height.

Figure 10:
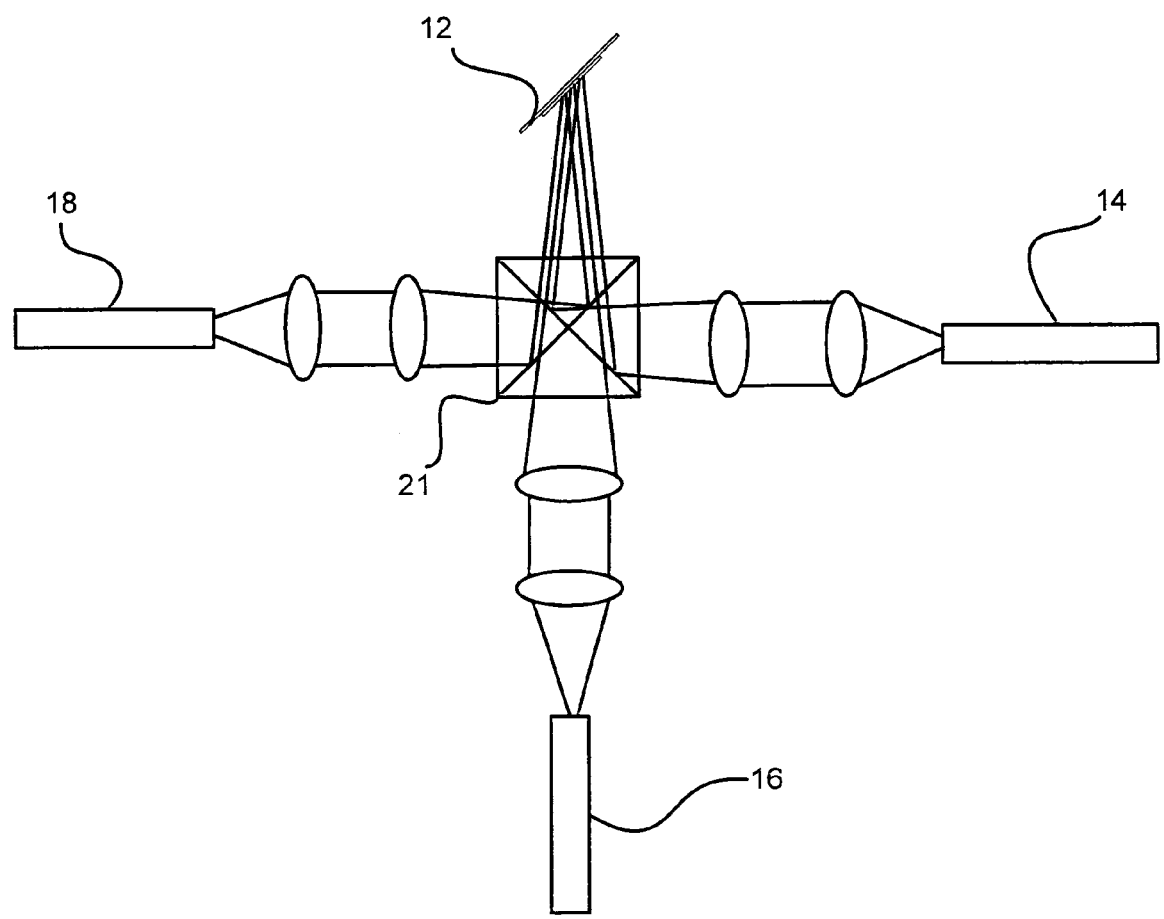
FIG. 10 illustrates an exemplary input optical assembly.

In addition, the input optical assembly 19 will also slightly offset the light from each of the red light source 14, the green light source 16, and the blue light source 18 as will be explained in more detail hereinafter. In one illustrative embodiment, the input optical assembly 19 may comprise an x-cube color combiner 21 as represented in FIG. 10.

The output optical assembly 20 is interposed in the optical path between the light modulation device 12 and the scanning mirror 22. Generally speaking, the purpose of the output optical assembly 20 is to direct modulated light onto the scanning mirror 22. In the case where the light modulation device 12 is operable to diffract light, the output optical assembly 20 will need to include a filter for separating diffracted light from non-diffracted light. In one illustrative embodiment, the filter may include a mask at a pupil plane to block the passage of reflected light and any unwanted orders of diffracted light. In an alternative illustrative embodiment, a modified Offner relay device with a Schlieren type filter, both well known to those skilled in the art, may be utilized to separate diffracted light from non-diffracted light, such as the one shown and described in U.S. Pat. No. 6,692,129, which patent is hereby incorporated by reference in its entirety.

The scanning mirror 22 may be an oscillating scanning mirror having a sweep rotation direction 26 and a retrace direction of rotation that is opposite of the sweep rotation direction. Typically, the entire frame of an image is drawn, in full color columns, onto an imaging surface with one sweep of the scanning mirror 22. The surface onto which the light is scanned may comprise any type of screen or a display, while the image itself may comprise pixels arranged in columns and rows.

In one illustrative embodiment, the projection system 10 sequentially scans column by column, completing each column in full color before scanning the next column of the image. As used herein, the term "full color" means with all of the required component red, green, and blue light is projected. It will be noted that this is significantly different from previously available systems that scan each color field sequentially, such as the DMD based systems. In another exemplary embodiment, the projection system 10 scans row by row, completing each row in full color before scanning the next row. In still another exemplary embodiment, the projection system 10 scans, in full color, a one-dimensional portion of the image before scanning a subsequent one-dimensional portion of the image. Thus, it will be appreciated that the present invention may scan column sequentially, row sequentially, or any other one-dimensional division of the image as may be desired. It will therefore be understood that the term "linear element," when referenced to an image, means a column, row or any other one-dimensional division of an image.

Figure 2:
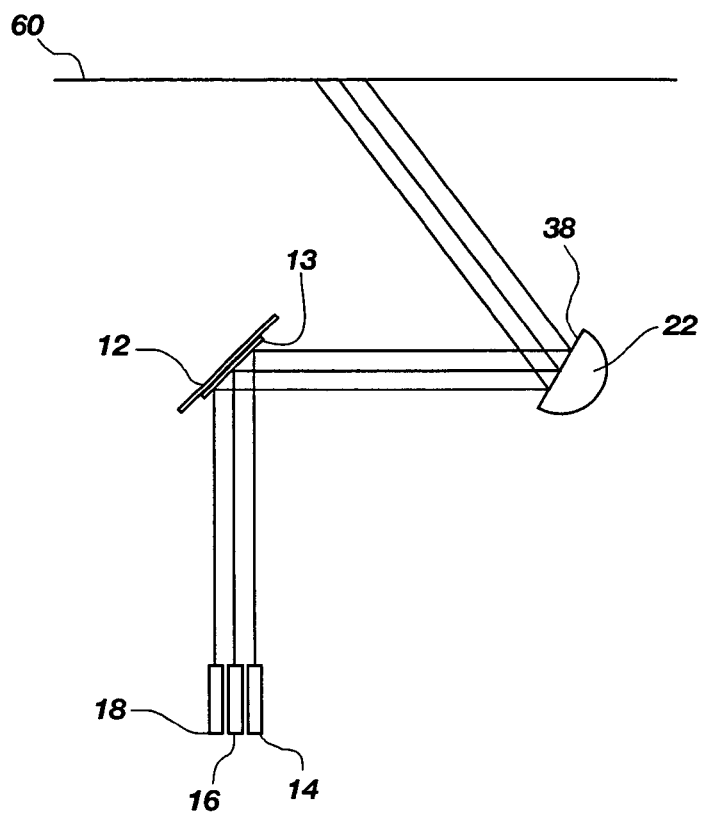
FIG. 2 illustrates the spatial separation of the different colors of light incident on a light modulation device.

Referring now to FIG. 2, there is depicted a diagram of the projection system 12 showing the paths of the light emitted from the red light source 14, the green light source 16 and the blue light source 18 with the scanning mirror 22 in a stationary position. It will be appreciated that this diagram is useful to understand the operation of the projection system 10, and that the scanning mirror 22 is not intended to operate in the standing position. Further, for purposes of clarity, the input optical assembly 19, the output optical assembly 20, and the projection lens 24 have been omitted from FIG. 2. But it is to be understood that they may be present. As can be observed, the light from each of the red light source 14, the green light source 16 and the blue light source 18 is spatially separated on the modulating surface 13 of the light modulation device 12. Likewise, the light from each of the red light source 14, the green light source 16 and the blue light source 18 is spatially separated on an imaging surface 60, and may or may not be spatially separated on a reflective surface 38 of the scanning mirror 22.

Figure 3:
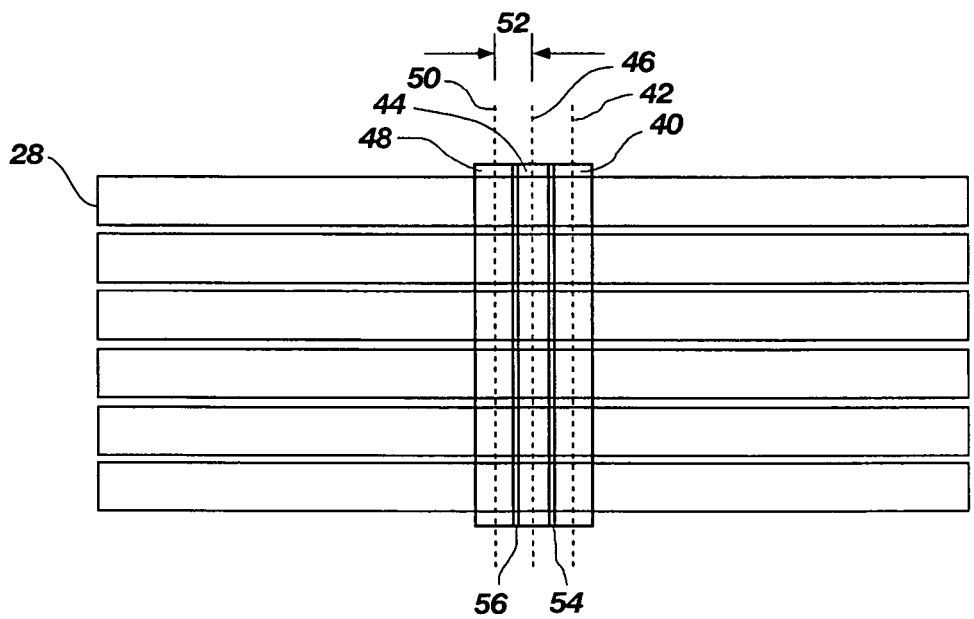
FIG. 3 illustrates the spatial separation of the different colors of light incident on a modulating surface of a light modulation device.

FIG. 3 is another diagram depicting the spatial separation of the light from each of the red light source 14, the green light source 16, and the blue light source 18 on the light modulating surface 13. A one-dimensional column of red light 40 is centered on a centerline 42. A one-dimensional column of green light 44 is centered on a centerline 46. A one-dimensional column of blue light 48 is centered on a centerline 50. It will be appreciated that each of the columns of light 40, 44, and 48 is substantially orthogonal to elongated elements 28 and may have a substantially uniform light distribution along their height such that each pixel is evenly illuminated. A distribution along a width of each of the columns of light 40, 44, and 48 may be non-uniform, such as a Gaussian distribution, with the most intense portion of the distribution forming the centerlines 42, 46 and 50 of each of the columns 40, 44 and 48, respectively. Further, even though each of the columns of light 40, 44, and 48 is centered at a spatially distinct location on the light modulating surface 13, there may be some overlapping regions of light 54 and 56 from adjacent columns.

A spacing 52, or spatial separation, between adjacent centerlines 42, 46 and 50 of the columns of light 40, 44 and 48, respectively, may be about between 2.3 microns and 2.7 microns. In one embodiment, the spacing is at least 1.5 microns. In another embodiment, the spacing is at least 2.0 microns. It will be understood that the spacing 52 may be determined as a function of pixel height. Even though there is a spatial separation of the columns of light 40, 44 and 48 on the light modulation device 12, the columns of light 40, 44 and 48 will not necessarily be centered at spatially distinct locations on the scanning mirror 22. The separation at the scanning mirror 22 is dependent upon the incident angles at the light modulation device.

It will be understood that in addition to the spatial separation of each of the colors or wavelengths of light on the light modulating surface 13 of the light modulation device 12, that the colors or wavelengths of light are also temporally spaced apart from each other. That is, each of the red light source 14, the green light source 16, and the blue light source 18 are pulsed at separate and distinct times, referred to sometimes herein as "temporal spacing" or "temporally spaced." This temporal spacing of the light sources will be discussed in relation to FIGS. 4 and 5 below.

The width of the beams falling on the light modulation device 12 should be wide enough so that there is no significant gap between adjacent columns or pixels on the screen. In one illustrative embodiment, the projection system 10 comprises a lens able to focus light from the red light source 14, the green light source 16 and the blue light source 18. The lens may comprise a focal point. However, because the lens may focus the light too narrowly, the modulating surface 13 of the light modulation device 12 may be located disjunct from the focal point of the lens such that the light is slightly unfocused on the modulating surface 13. This slightly unfocused state of the light operates to widen the columns of light 40, 44 and 48 on the light modulating surface such that there are no gaps between adjacent columns of the image on the imaging surface.

Figure 4:
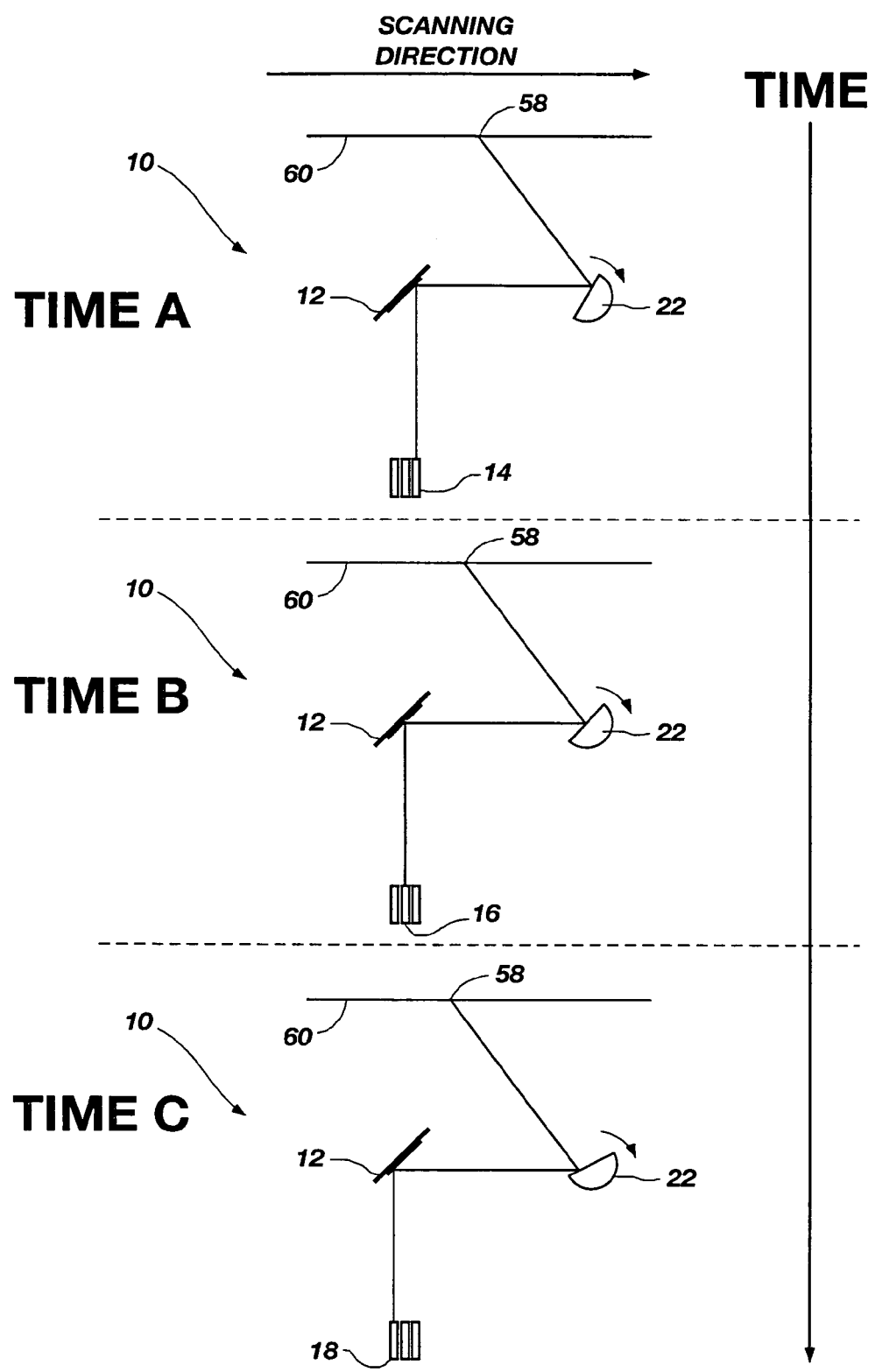
FIG. 4 illustrates the temporal separation of the pulses of the different colors of light incident on the light modulation device.

FIG. 4 depicts a timing diagram for the projection system 10 at Time A, Time B and Time C. Again, for the purposes of convenience, the input optical assembly 19, the output optical assembly 20 and the projection lens 24 have been omitted from the diagram, but it is to be understood that they may be present. As can be observed by the timing indicator on the right side of FIG. 4, time is increasing from the top of the diagram to the bottom of the diagram. Thus, Time A is earlier than Time B and Time C, and Time B is earlier than Time C.

As mentioned previously, the present invention is an improvement over the previously available devices due to its ability to form an image by sequentially forming each column or row of the image in full color before forming subsequent columns or rows of the image. The process of forming a single column, referred to as the target column 58, on the surface 60 in full color using a single light modulating device is shown in FIG. 4.

At Time A of FIG. 4, the red light source 14 is shown pulsing a beam of red light onto the light modulating device 12. The light modulating device 12 then modulates the red light. After modulation, the modulated red light is directed onto the scanning mirror 22. The scanning mirror 22 in turn reflects the modulated red light onto the surface 60 in the position of the target column 58. In this manner, the projection system 10 first forms the red component of the target column 58.

Next, at Time B, the red light source 14 has turned off and the light modulation device 12 has been reconfigured to receive the next color of light, green. The green light source 16 pulses green light onto the light modulating device 12 at a spatially distinct location from the red light source 14. The light modulating device 12 modulates the green light. After modulation, the modulated green light is directed onto the scanning mirror 22. Note that between Time A and Time B, the scanning mirror 22 has rotated such that the green light pulse is reflected to thereby strike the same target column 58 as the red light pulse. It will be appreciated that the rotation of the scanning mirror 22 is exaggerated in FIG. 4 in order to show the concepts discussed herein. In this manner, the projection system 10 forms the green component of the target column 58.

Next, at Time C, the green light source 16 has turned off and the light modulation device 12 has been reconfigured to receive the next color of light, blue. The blue light source 18 pulses blue light onto the light modulating device 12 at a spatially distinct location from both the red light source 14 and the green light source 16. The light modulating device 12 modulates the blue light. After modulation, the modulated blue light is directed onto the scanning mirror 22. Note that between Time B and Time C, the scanning mirror 22 has rotated such that the blue light pulse is reflected to thereby strike the same target column 58 as the red light pulse and the green light pulse. In this manner, the projection system 10 forms the blue component of the target column 58.

A human eye is able to integrate the red, green, and blue components of the target column 58, and the viewer is able to see the column in full color. The above described processes at Time A, Time B and Time C are then repeated for each subsequent column of the image to thereby form full-color columns of the image in a column sequential manner. It will be appreciated that in other embodiments, the order of the colors of the light may be modified without departing from the scope of the present invention.

It will be further appreciated, that the light modulating device 12 is synchronized with each of the red light source 14, the green light source 16 and the blue light source 18. That is, the light modulating device 12 reconfigures to receive each of the pulses of light to appropriately modulate the received light. Thus, it is desirable that the light modulating device 12 have a relatively high switching rate in order to form the full-color columns in a sequential manner. It will be appreciated that the same principles illustrated in FIG. 4 of the present invention may be used to form rows or other linear elements of an image in a full-color and sequential manner.

Figure 5:
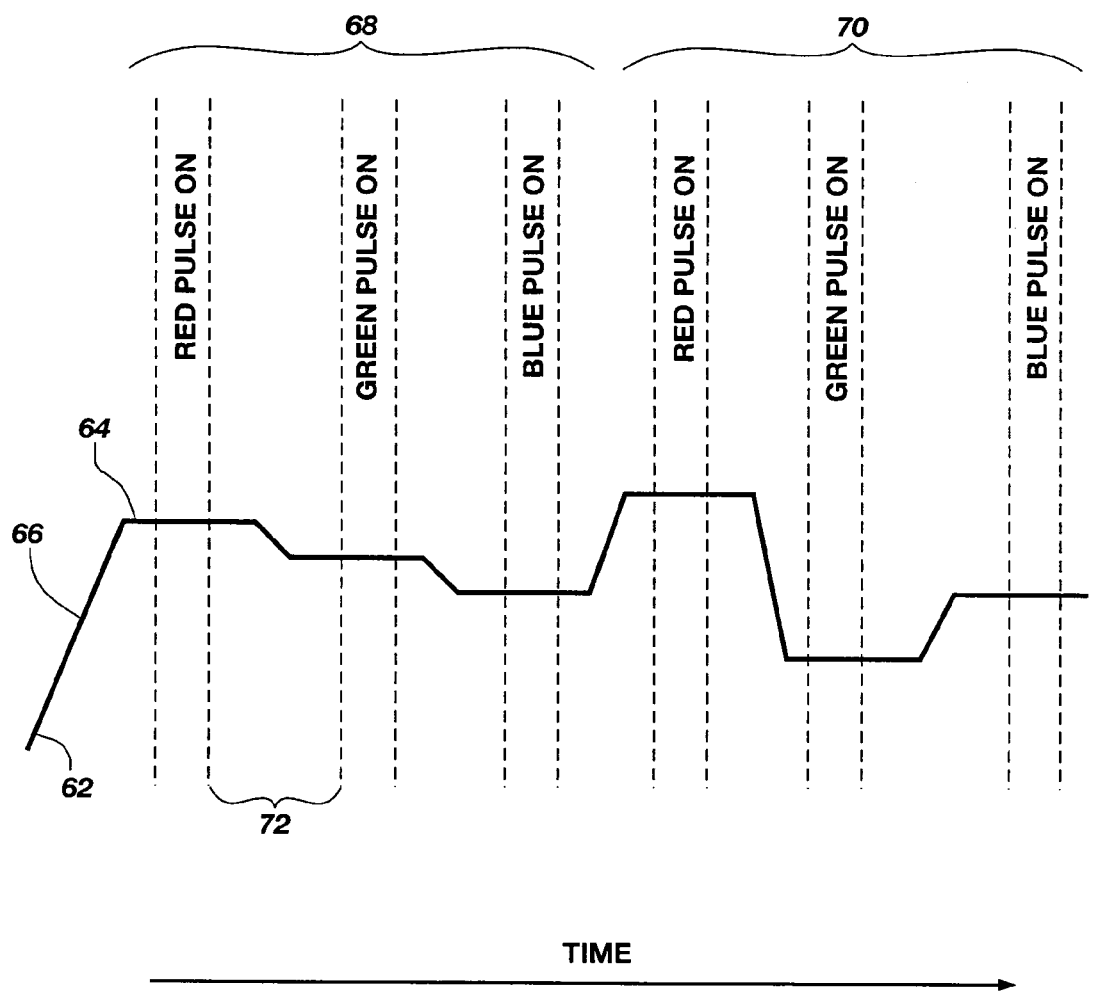
FIG. 5 is a graph illustrating the temporal separation of the pulses of the different colors of light incident on the light modulation device.

Referring now to FIG. 5, there is shown a graph depicting the formation of two adjacent columns, or pixels, of an image on a screen. The timing indicator at the bottom of FIG. 5 shows that time increases from left to right across the graph. A line 62 represents the state of the light modulation device 12. Where the line 62 is horizontal, as shown by the reference numeral 64, the light modulation device 12 is stable or ready to modulate the next incoming pulse of light. Where the line 62 is non-horizontal, such as in the position represented by the reference numeral 66, the light modulation device 12 is unstable, or in a state of transition. It will be observed that the red, green and blue light sources 14, 16 and 18 are only pulsed when the light modulation device 12 is in the correct configuration or state. The light sources 14, 16 and 18, could, however, also be pulsed when the light modulation device 12 is in a state of transition, but this will increase the brightness, but reduce the resolution of the projected image. Thus, preferentially, the red, green and blue light sources 14, 16 and 18 are not pulsed while the light modulation device 12 is moving or transitioning between two states. A first set of light pulses 68, having one of each color of light, forms a full-color column and the second set of light pulses 70, also having one of each color, forms an adjacent full-color column.

The temporal separation between the pulses, indicated by the reference numeral 72 (this should indicate the center-to-center distance of the pulses, not the space between), is dependent upon the number of columns (aspect ratio) of the image, retrace time, and the refresh frequency. For example, for a 60 Hz refresh rate, 8000 column image, and a 20% retrace time, the time for each column is (1/60 seconds)/(10,000 columns). Thus, the center-to-center temporal separation of the pulses would be 1.67 microseconds/3 or about 0.556 microseconds. In one illustrative embodiment, the temporal separation between the pulses, is between about 0.3 microseconds and about 0.8 microseconds. In one illustrative embodiment, the time between the pulses is about 0.556 microseconds. Thus, it is to be understood that the pulse duration is determined as a function of a resolution of the projector.

Figure 6:
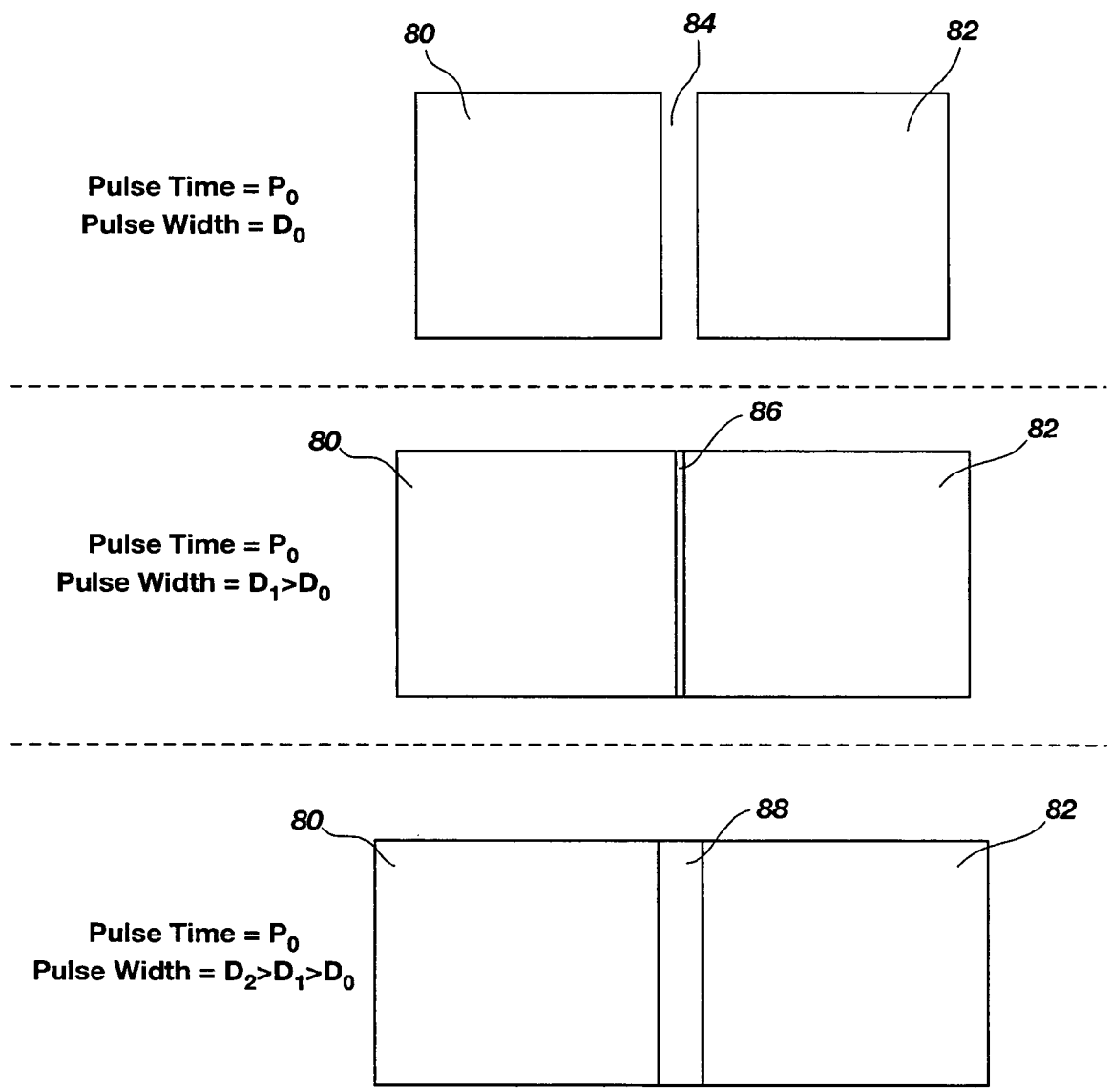
FIG. 6 illustrates a diagram of the effects on an interpixel gap by varying the pulse width on adjacent pixels of an image.

As alluded to above, the scanning of a one-dimensional image, e.g., a column, to form a two-dimensional image may undesirably result in gaps between adjacent columns and pixels. The present invention includes the reduction or elimination of these gaps in one of two ways. First, as shown in FIG. 6, the width of the pulses of light directed onto the light modulation device 12 may be varied while holding the pulse duration constant. In particular, at Pulse Time=$P_0$ and the Pulse Width=$D_0$, a first pixel 80 and a second pixel 82 are separated by an interpixel gap 84. At Pulse Time=$P_0$ and the Pulse Width=$D_1$>$D_0$, the first pixel 80 and the second pixel 82 form an overlapping region 86. At Pulse Time=$P_0$ and the Pulse Width=$D_2$>$D_1$>$D_0$, the first pixel 80 and the second pixel 82 form an overlapping region 88, which is larger than the overlapping region 86. As explained above, the width of the pulses of light can be varied by slightly defocusing the light on the light modulation device 12.

Figure 7:
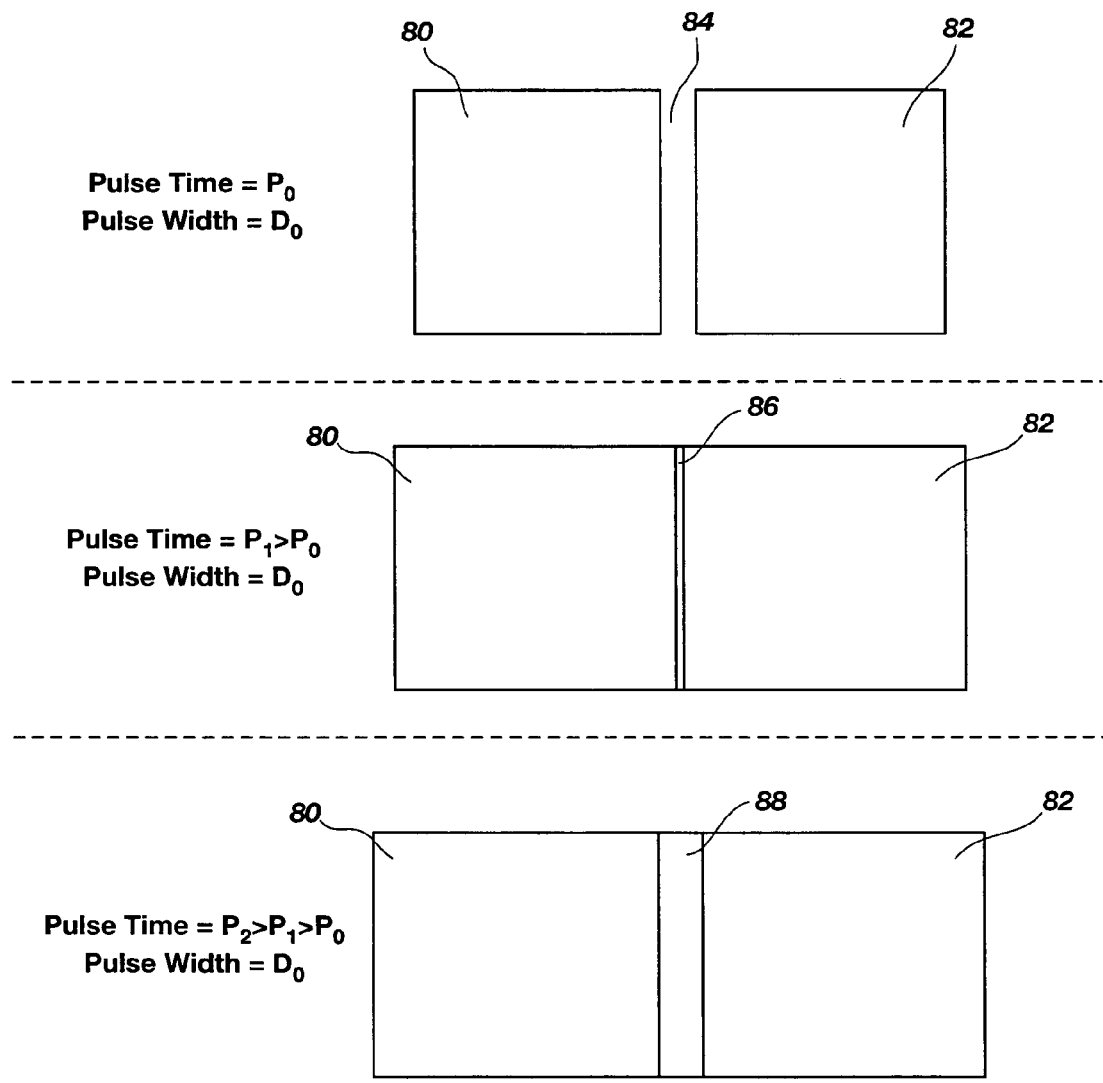
FIG. 7 illustrates a diagram of the effects on an interpixel gap by varying the pulse duration on adjacent pixels of an image.

Second, the gaps between pixels may be eliminated by varying the pulse duration of the light as shown in FIG. 7. In particular, at Pulse Time=$P_0$ and the Pulse Width=$D_0$, the first pixel 80 and the second pixel 82 are separated by the inter-pixel gap 84. At Pulse Time=$P_1 > P_0$ and the Pulse Width=$D_0$, the first pixel 80 and the second pixel 82 form the overlapping region 86. At Pulse Time=$P_2 > P_1 > P_0$ and the Pulse Width=$D_0$, the first pixel 80 and the second pixel 82 form the overlapping region 88, which is larger than the overlapping region 86. It will be appreciated that, in addition to eliminating the gaps between pixels, it may be desirable to vary the sharpness or softness of an image. The present invention is able to do so by varying the pulse duration or the width of the pulses.

Further, while the light modulation device 12 (see FIGS. 1-2, 8-9 & 10) has been described herein as using a grating light valve, the present invention is not to be considered so limited. The light modulating device 12 may be any type of device adapted to modulate light, including a digital mirror device, a light diffraction device, or any other type of device adapted to modulate light. The light modulating device 12 may also be a differential interferometric light modulator. One example of a differential interferometric light modulator is disclosed in U.S. Pat. No. 7,054,051, which is hereby incorporated by reference in its entirety into the present application.

It will be noted that each pulse of light from the red light source 14, the green light source 16 and the blue light source 18 may have a time duration. Each of the light sources may be pulsed at a distinct time duration in relation to the other light sources. It will be further noted that more than three light sources may be utilized in accordance with the present disclosure, including, without limitation four light sources, five light sources, and six light sources. A light source may comprise a plurality of light sources emitting light of the same wavelength and may further comprise one or more semiconductor lasers.

Further, the order of the pulsing of the light sources may be varied. Additionally, it should be noted that the light sources may be pulsed out of order, i.e., non-sequentially. For example, the light sources may be pulsed in the following order: red, green, green, blue, red, green, green, blue. Other sequences may be used as well.

In addition, it will be understood that each of the plurality of light sources 14, 16 and 18 (see FIGS. 1-2 & 4) described above may emit a range of wavelengths of light in lieu of a discrete wavelength of light. For example, a color of light may be formed by two or more light sources emitting discrete wavelengths. In addition, some light sources may emit multiple discrete wavelengths of light to form a color.

Those having ordinary skill in the relevant art will appreciate the advantages provided by the features of the projection system of the present disclosure. For example, it is a feature of the present disclosure to provide a projection system that is able to scan an image in a full-color column or row sequential manner. That is, the present invention is able to draw a column or row of an image in full color before drawing the subsequent columns or rows of the image. Another feature of the present invention is to provide a manner of reducing gaps between adjacent pixels or columns on a projection screen. It is a further feature of the present disclosure, in accordance with one aspect thereof, to provide a projection system that uses a single light modulation device in conjunction with three light sources of different colors.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each appended claim. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein. Thus, while the present invention has been shown in the drawings and fully described above with particularity and detail in connection with what is presently deemed to be the most illustrative embodiment(s) of the invention, it will be apparent to those of ordinary skill in the art that numerous modifications, including, but not limited to, variations in size, materials, shape, form, function and manner of operation, assembly and use may be made without departing from the principles and concepts set forth herein.

The invention claimed is:

1. A projection system for generating an image on a surface, the projection system comprising:
   a light modulation device;
   a plurality of light sources, each of the plurality of light sources emitting a different wavelength of light that is imaged on the light modulation device as a column of light having a height, a width, and a centerline bisecting the column of light along its height;
   an input optical assembly interposed between said light modulation device and the plurality of light sources; and
   wherein each of centerlines of the columns of light is centered on the light modulation device at a spatially distinct location with respect to the centerlines of the other columns of light;
   wherein a spacing between adjacent centerlines of columns of light on the light modulation device is at least 1.5 microns;
   wherein each column of light has a substantially uniform distribution along its height and a non-uniform distribution along its width.

2. The projection system of claim 1, wherein said light modulation device is operable between a first configuration and a second configuration, wherein said first configuration acts to reflect incident light as a plane mirror and said second configuration acts to diffract incident light.

3. The projection system of claim 1, wherein the light modulation device comprises a plurality of elongated ribbons, each of the plurality of elongated ribbons having a light reflective surface.

4. The projection system of claim 1, wherein said plurality of light sources comprises a red light source, a green light source and a blue light source.

5. The projection system of claim 1, wherein each of the plurality of light sources is a laser.

6. The projection system of claim 1, further comprising a scanning mirror for scanning modulated light.

7. The projection system of claim 1, further comprising a projection lens.

8. The projection system of claim 1, wherein the image comprises a plurality of linear elements, and wherein the light modulation device modulates the different wavelengths of light to thereby sequentially form, in full color, each of the linear elements of the image on a reflective surface.

9. The projection system of claim 8, wherein said linear elements comprise at least one of columns and rows of the image.

10. The projection system of claim 1, wherein the plurality of light sources pulses each of the different wavelengths of light at a temporally distinct time.

11. The projection system of claim 1, further comprising a filter for separating a diffracted portion of light from a non-diffracted portion of light.

12. The projection system of claim 1, wherein the plurality of light sources emits each of the wavelengths of light in pulses having a pulse duration.

13. The projection system of claim 12, wherein the pulse duration of each of the wavelengths of light is variable.

14. The projection system of claim 12, wherein the pulse duration is determined as a function of a resolution of a projector.

15. The projection system of claim 12, wherein the pulse duration is about 0.5 microseconds.

16. The projection system of claim 1, further comprising a lens having a focal point, said lens operable to focus the wavelengths of light, wherein a modulating surface of the light modulator is located disjunct from the focal point of the lens such that the wavelengths of light are slightly unfocused on the modulating surface.

17. The projection system of claim 1, wherein the image comprises a plurality of pixels, each of the pixels having a pixel height; and wherein spacing between the centerlines of adjacent columns of light is determined as a function of the pixel height.

18. The projection system of claim 1, wherein the spacing between adjacent centerlines of columns of light on the light modulation device is at least 2.0 microns.

19. The projection system of claim 1, wherein the spacing between adjacent centerlines of columns of light on the light modulation device is between 2.3 microns and 2.7 microns.

20. A projection system for generating an image on a surface, the image comprising a plurality of linear elements, the projection system comprising:
 a light modulation device;
 a scan mirror;
 a plurality of light sources, each of the plurality of light sources emitting a different wavelength, or range of wavelengths, of light that is incident on the light modulation device; and
 wherein the light modulation device modulates the light incident thereon to thereby sequentially form, in full color, each of the plurality of linear elements of the image on the surface during a single sweep of the scan mirror.

21. The projection system of claim 20, wherein said light modulation device is operable between a first configuration and a second configuration, wherein said first configuration acts to reflect incident light as a plane mirror and said second configuration acts to diffract incident light.

22. The projection system of claim 20, wherein the light modulation device comprises a plurality of elongated ribbons, each of the plurality of ribbons having a light reflective surface.

23. The projection system of claim 20, wherein said plurality of light sources comprises a red light source, a green light source, and a blue light source.

24. The projection system of claim 20, wherein each of the plurality of light sources is a laser.

25. The projection system of claim 20, further comprising a projection lens.

26. The projection system of claim 20, wherein said plurality of linear elements comprise at least one of columns and rows of the image.

27. The projection system of claim 20, wherein the light from each of the plurality of light sources is centered on the light modulation device at a spatially distinct location.

28. The projection system of claim 20, wherein each of said plurality of light sources pulses light at a temporally distinct time.

29. The projection system of claim 20, further comprising a filter for separating a diffracted portion of light from a non-diffracted portion of light.

30. A projection system comprising:
 a scanning mirror;
 a plurality of light sources, each of the plurality of light sources emitting a different wavelength, or range of wavelengths, of light that is incident on the scanning mirror after being modulated; and
 wherein each of the different wavelengths, or range of wavelengths, of light is centered on the scanning mirror at a location that is spatially distinct.

31. The projection system of claim 30, wherein each of the different wavelengths, or range of wavelengths, of light is incident on the scanning mirror at a temporally distinct time.

32. The projection system of claim 30, further comprising a light modulation device, said light modulation device disposed in an optical path between the plurality of light sources and the scanning mirror.

33. The projection system of claim 32, wherein said light modulation device is operable between a first configuration and a second configuration, wherein said first configuration acts to reflect incident light as a plane mirror and said second configuration acts to diffract incident light.

34. The optical device of claim 32, wherein the light modulation device comprises a plurality of ribbons, each of the plurality of ribbons having a light reflective surface.

35. The optical device of claim 30, wherein modulated light scanned by the scanning mirror sequentially forms, in full color, a plurality of linear elements of an image on a surface.

36. The optical device of claim 35, wherein said linear elements comprises at least one of columns and rows of the image.

37. A method for forming an image on a surface, the image comprising a plurality of linear elements, the method comprising the step of sequentially forming, in full color, each of the linear elements of the image on the surface using a single light modulation device during a single sweep of a scan mirror.

38. The method of claim 37, further comprising the step of pulsing each of a plurality of different wavelengths of light onto the single light modulation device at a temporally distinct time.

39. The method of claim 38, further comprising the step of centering the different wavelengths of light onto spatially distinct locations of the single light modulation device.

40. The method of claim 37, wherein said single light modulation device is operable between a first configuration and a second configuration, wherein said first configuration acts to reflect incident wavelengths of light as a plane mirror and said second configuration acts to diffract incident wavelengths of light.

41. The method of claim 37, wherein said linear elements comprises at least one of columns and rows of the image.

42. The method of claim 37, further comprising the step of scanning modulated wavelengths of light with a scanning mirror.

43. The method of claim 37, further comprising the step of separating a diffracted portion of light from a non-diffracted portion of light.

* * * * *